Nov. 24, 1953 E. H. THOMPSON 2,660,351
PRODUCT DISPENSING MACHINE
Filed March 31, 1951 15 Sheets-Sheet 1

Inventor:
Ernest H. Thompson
By Bair, Freeman & Molinare
Attys.

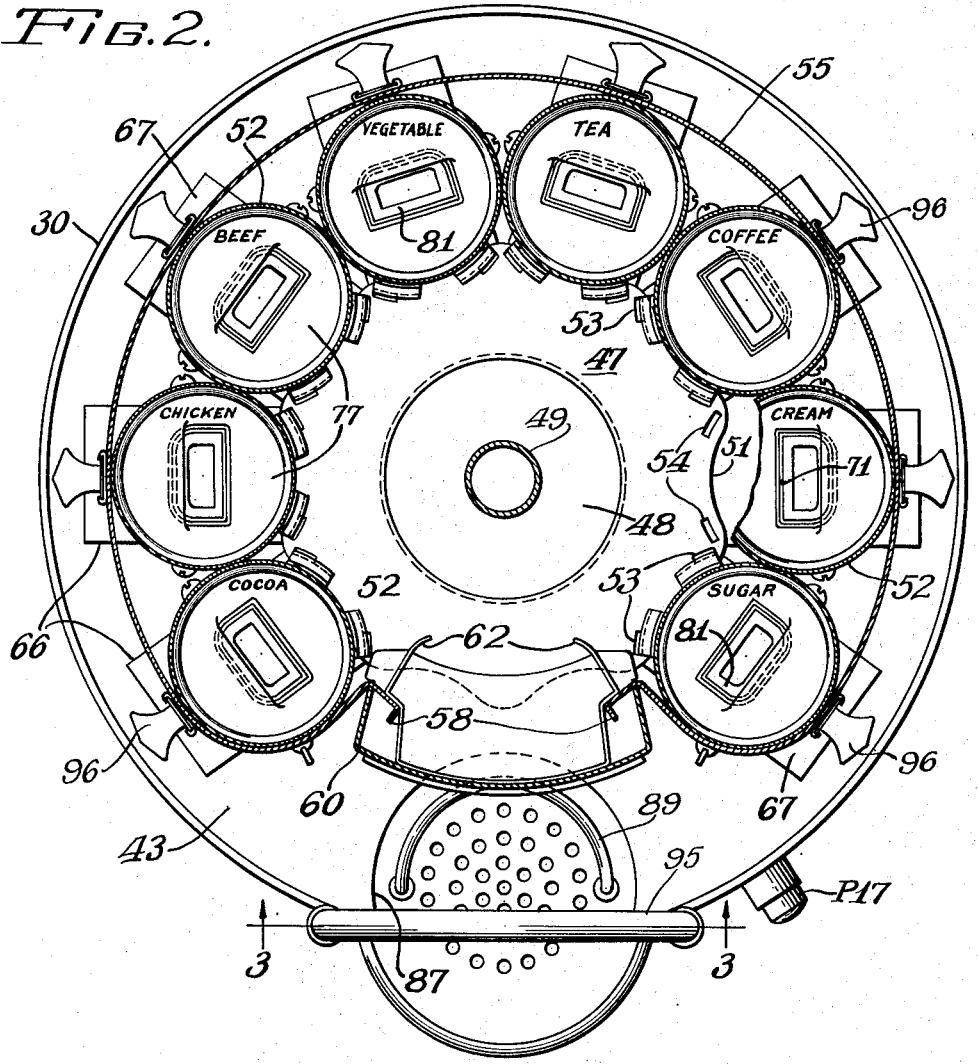

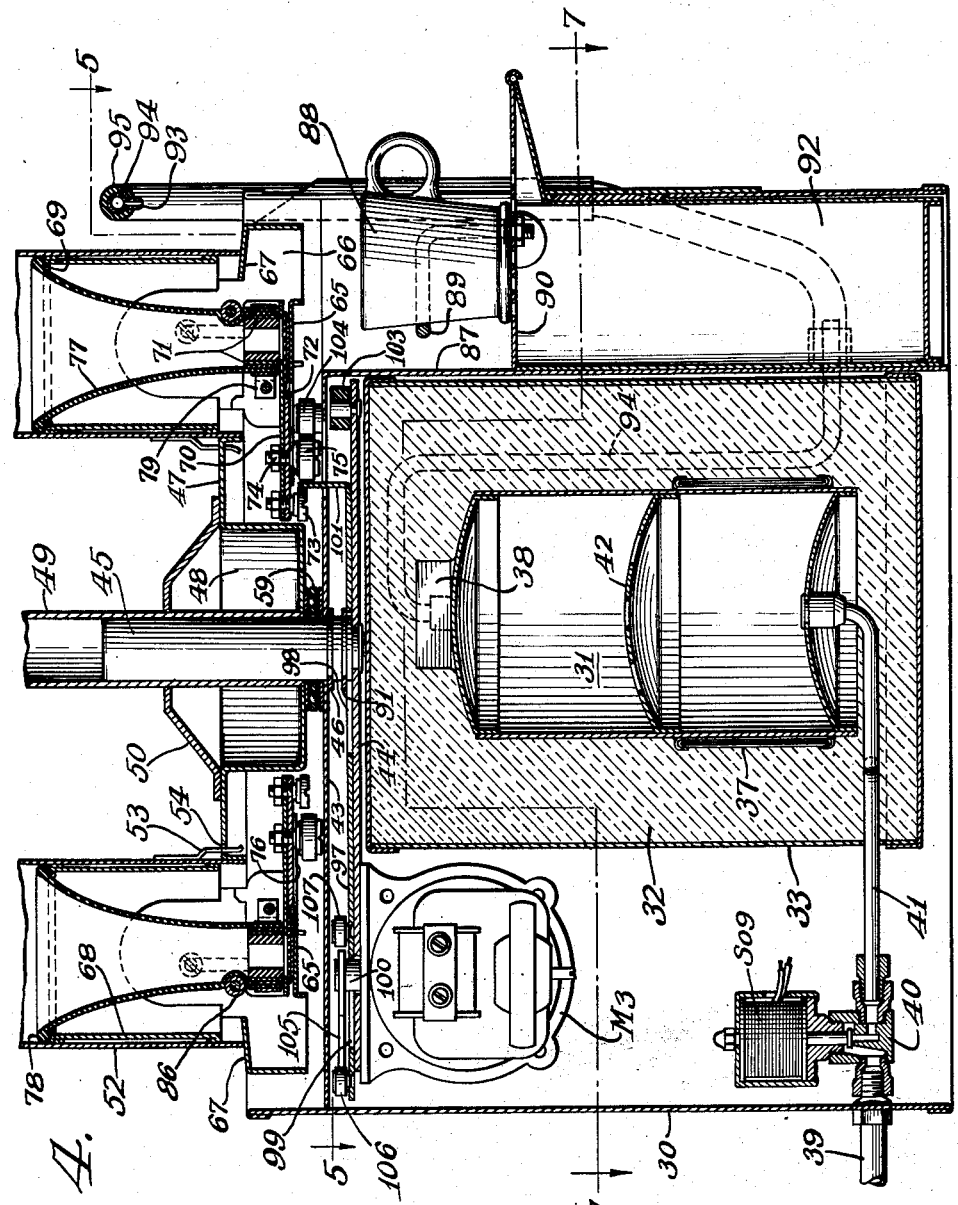

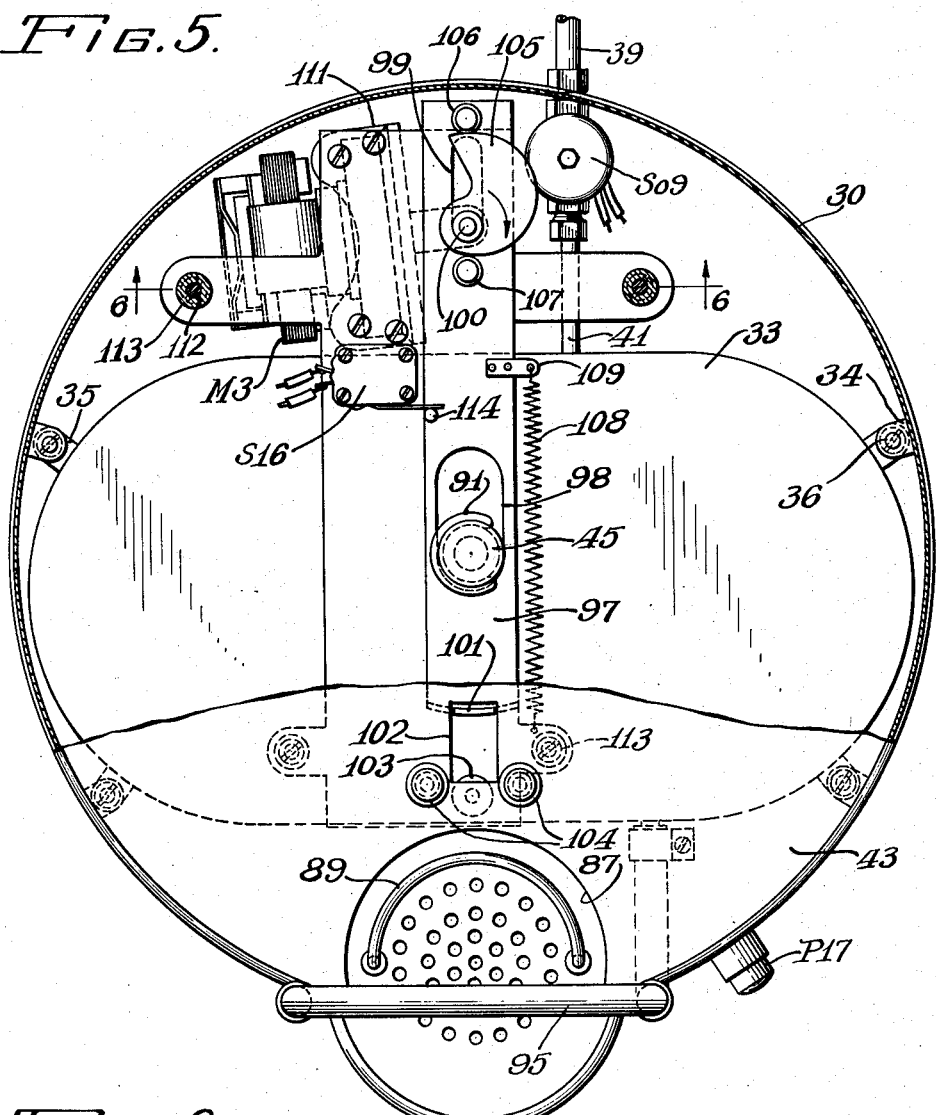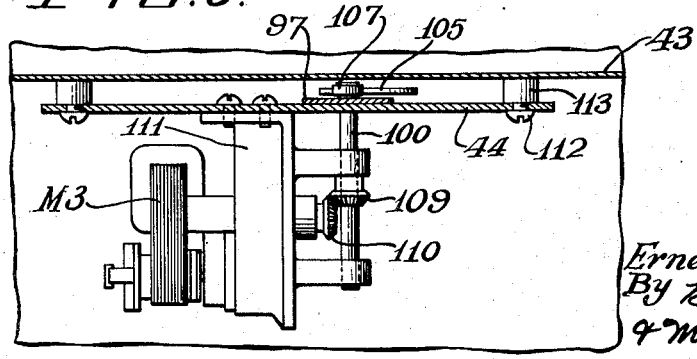

Nov. 24, 1953
E. H. THOMPSON
2,660,351
PRODUCT DISPENSING MACHINE
Filed March 31, 1951
15 Sheets-Sheet 5
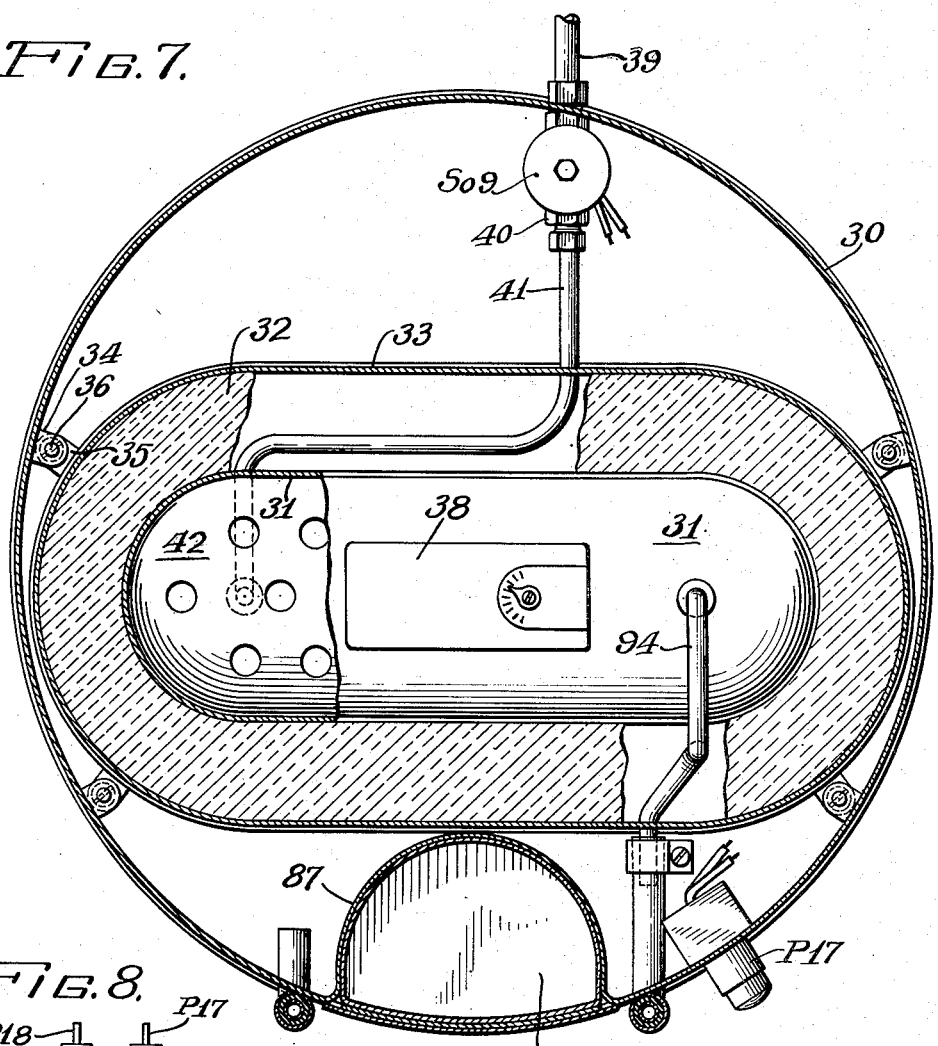
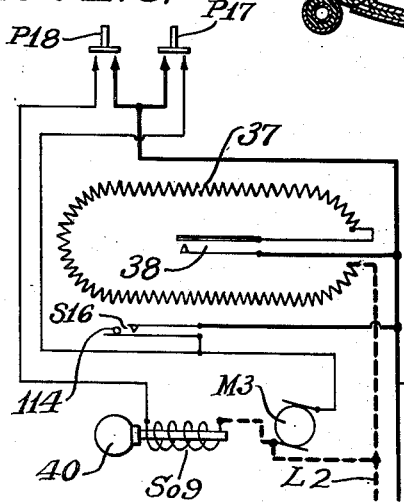
Inventor:
Ernest H. Thompson
By Bair, Freeman & Molinare
Attys.

Nov. 24, 1953  E. H. THOMPSON  2,660,351
PRODUCT DISPENSING MACHINE
Filed March 31, 1951  15 Sheets-Sheet 6

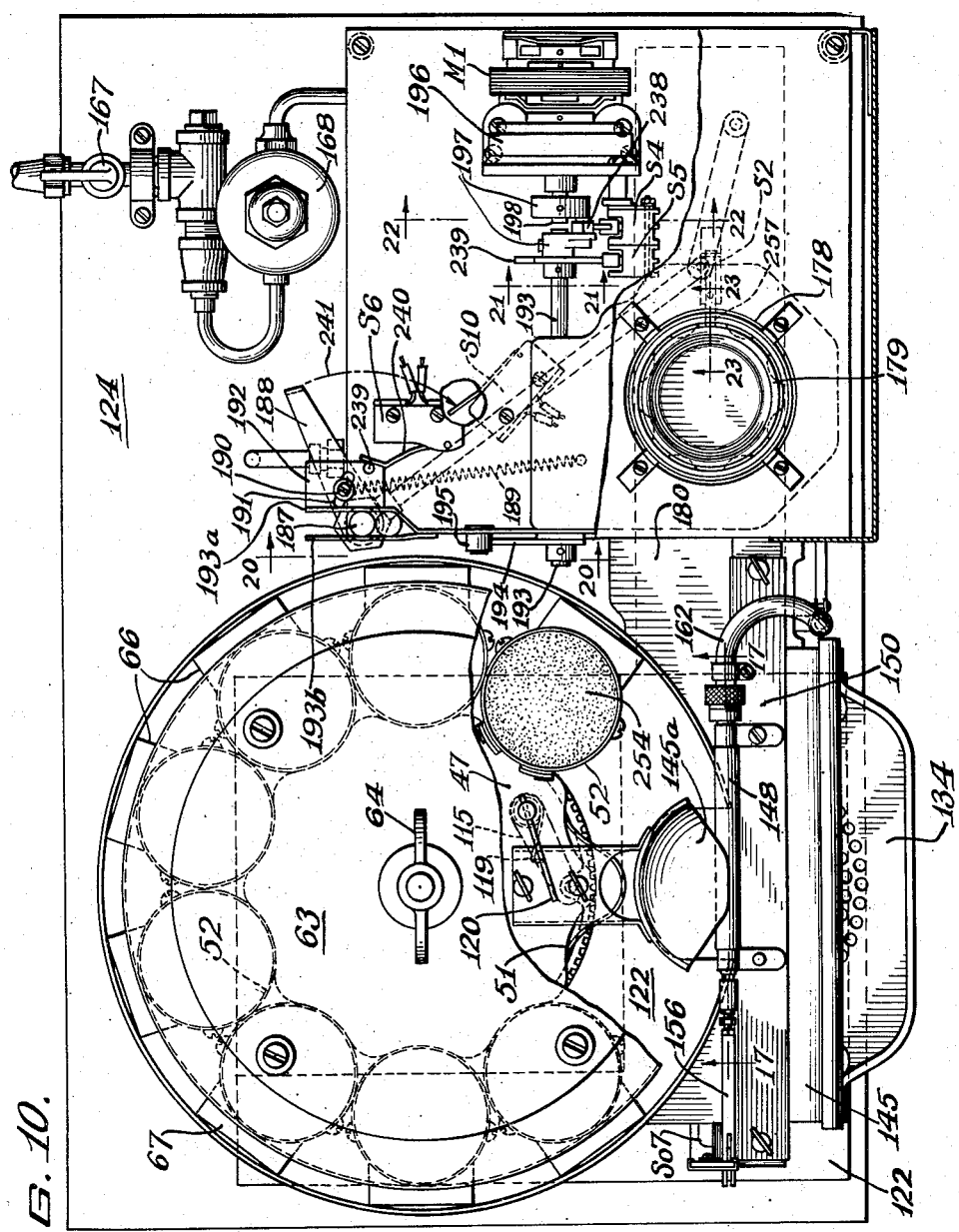

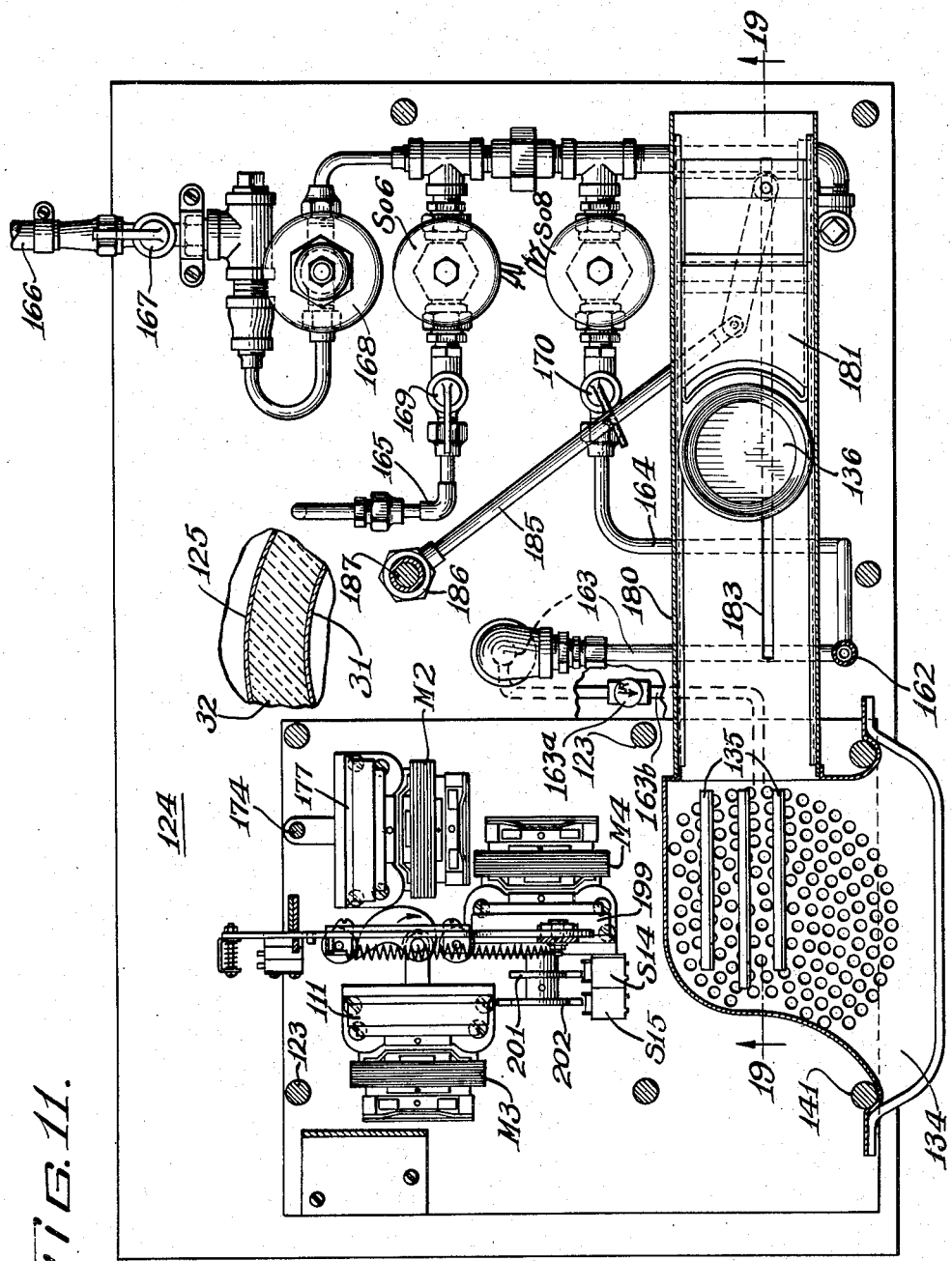

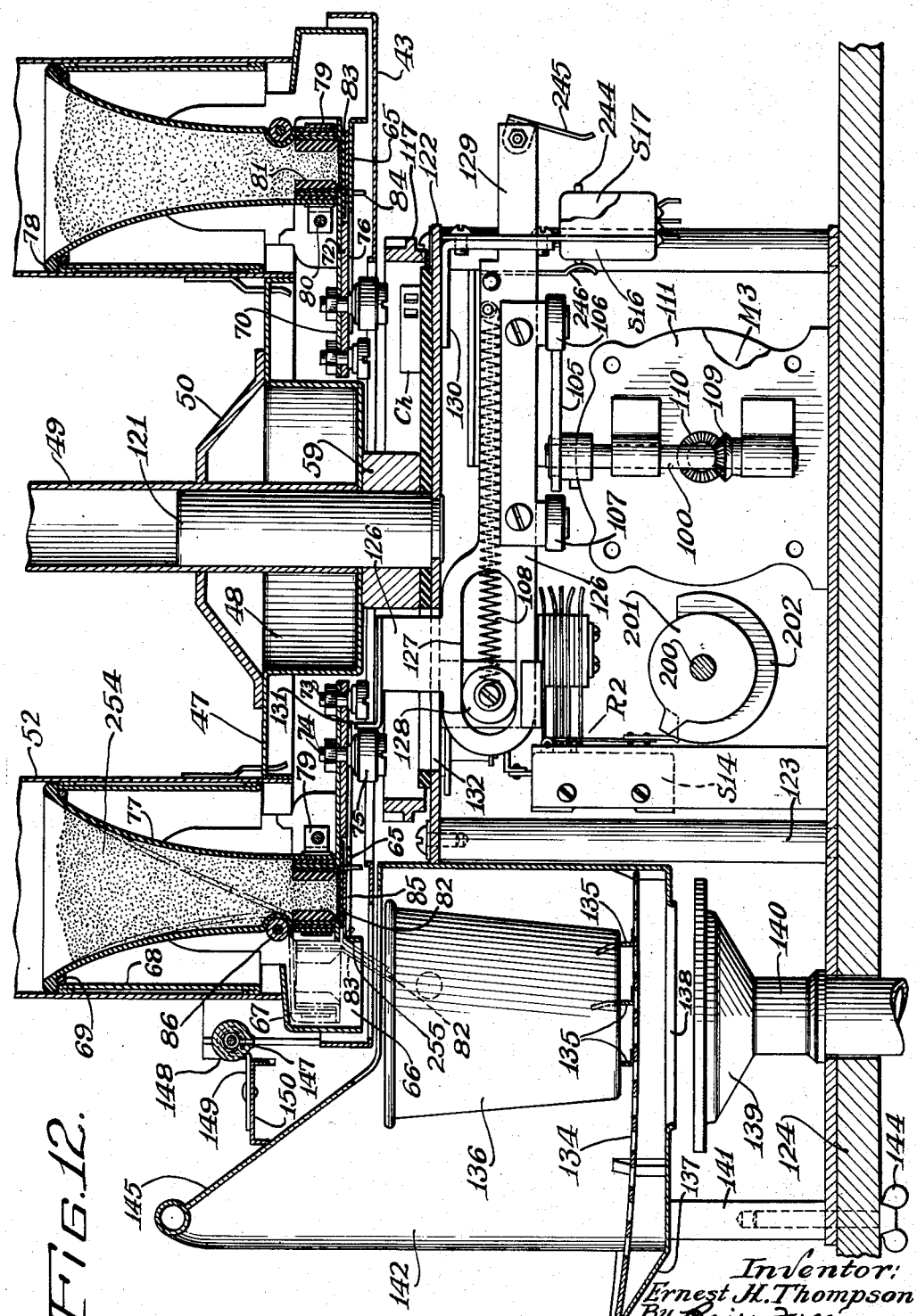

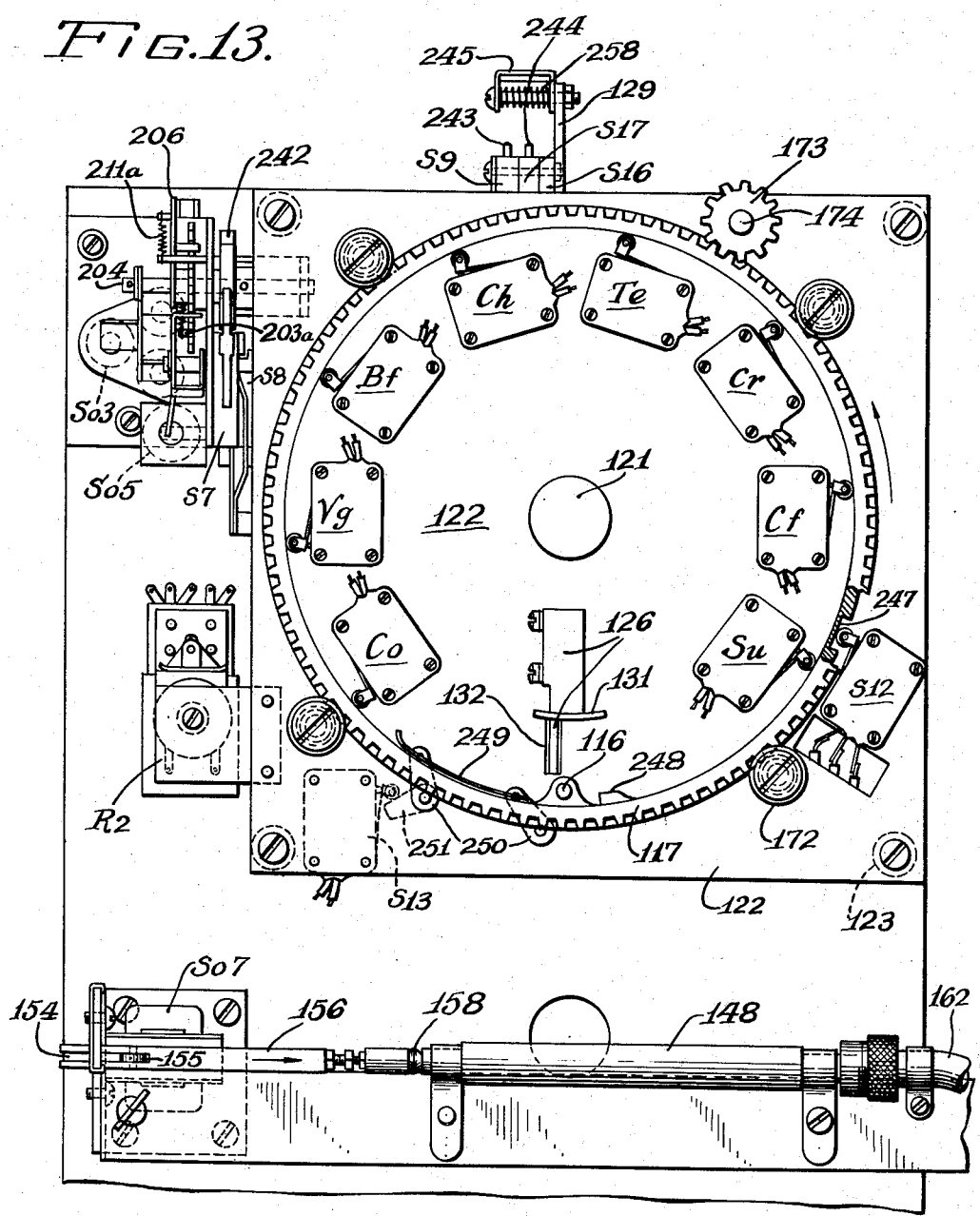
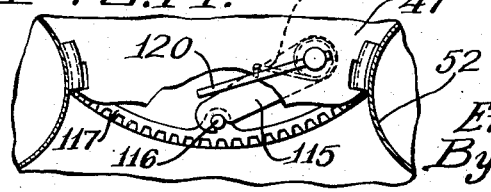

Nov. 24, 1953   E. H. THOMPSON   2,660,351
PRODUCT DISPENSING MACHINE
Filed March 31, 1951   15 Sheets-Sheet 11
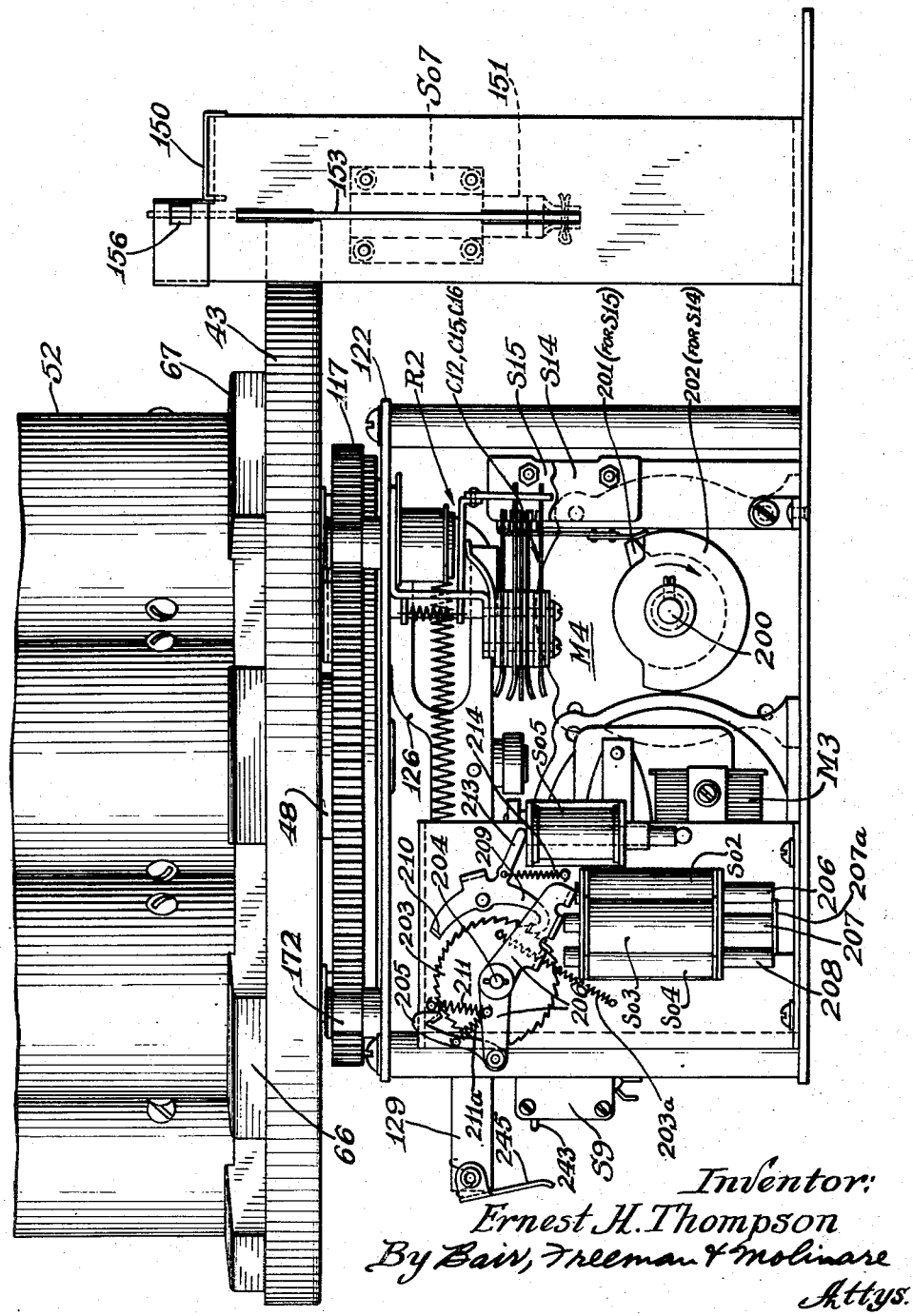
Inventor:
Ernest H. Thompson
By Bair, Freeman & Molinare
Attys.

Nov. 24, 1953  E. H. THOMPSON  2,660,351
PRODUCT DISPENSING MACHINE
Filed March 31, 1951  15 Sheets-Sheet 12
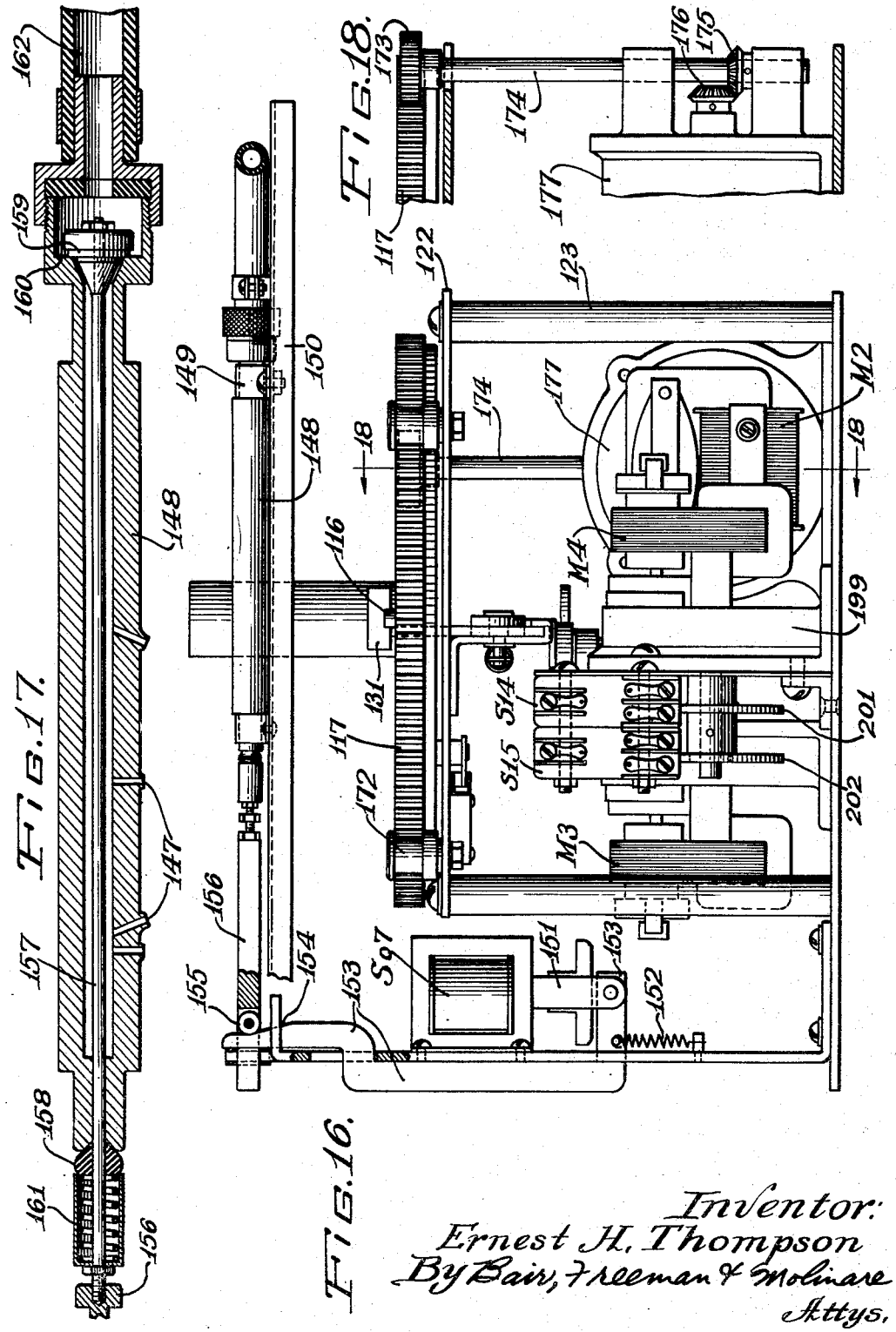
Inventor:
Ernest H. Thompson
By Bair, Freeman & Molinare
Attys.

Nov. 24, 1953  E. H. THOMPSON  2,660,351
PRODUCT DISPENSING MACHINE
Filed March 31, 1951  15 Sheets-Sheet 13
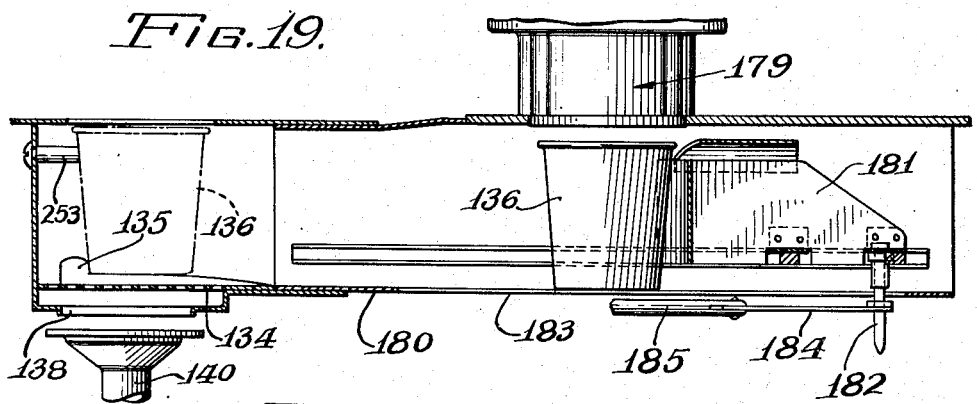
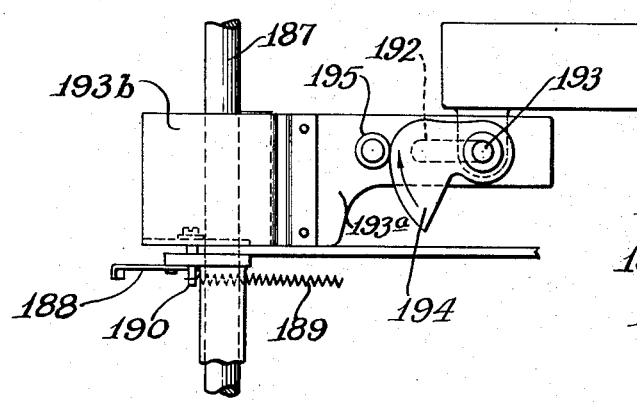
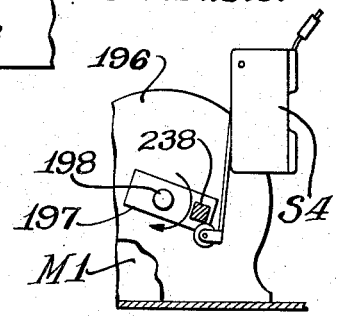
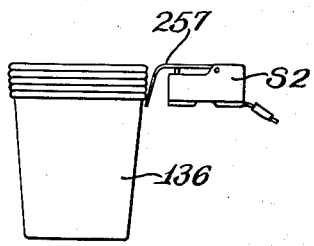
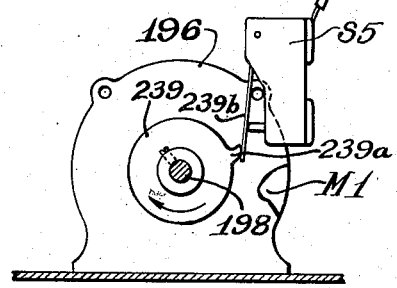
Inventor:
Ernest H. Thompson
By Bair, Freeman & Molinare
Attys.

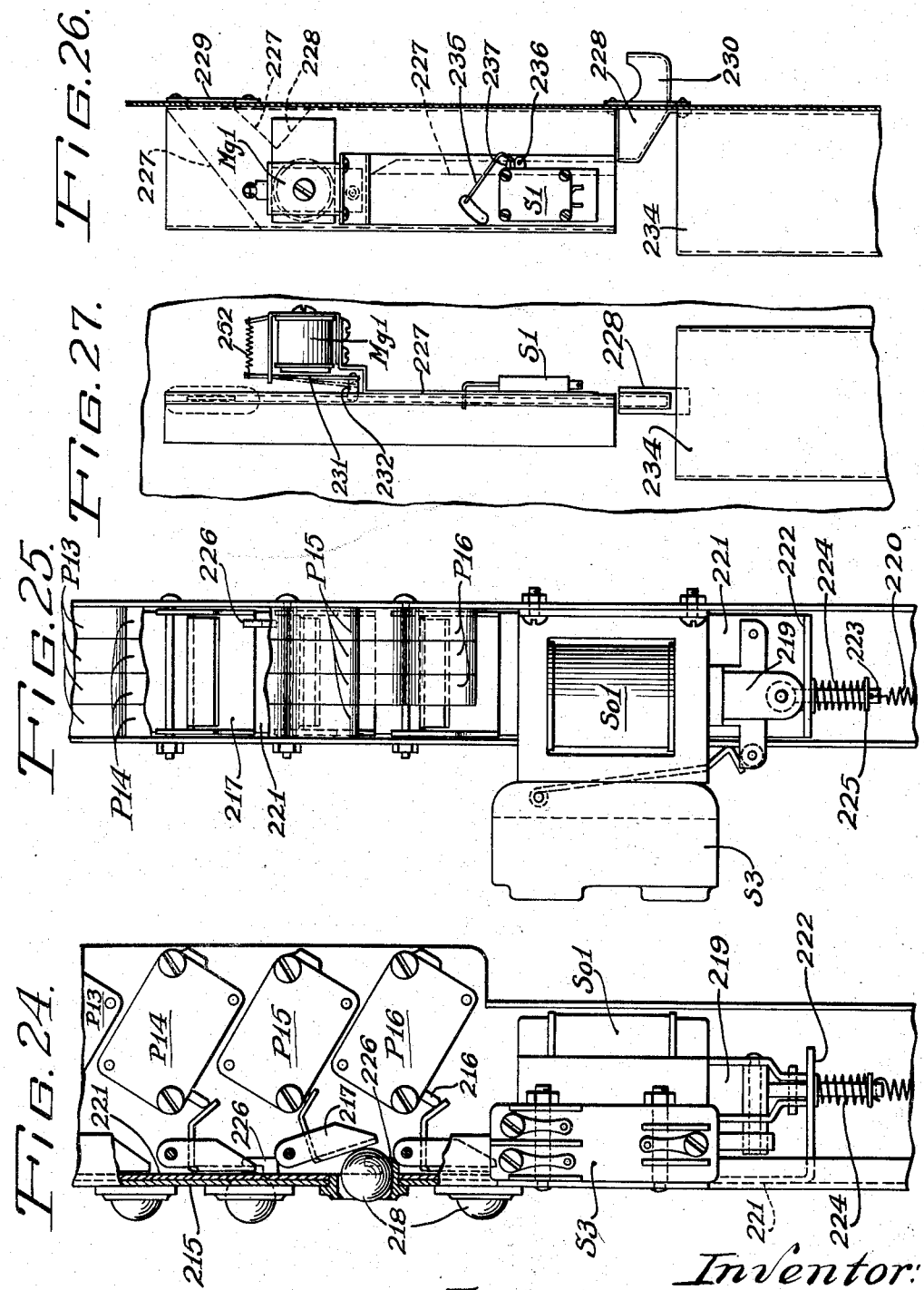

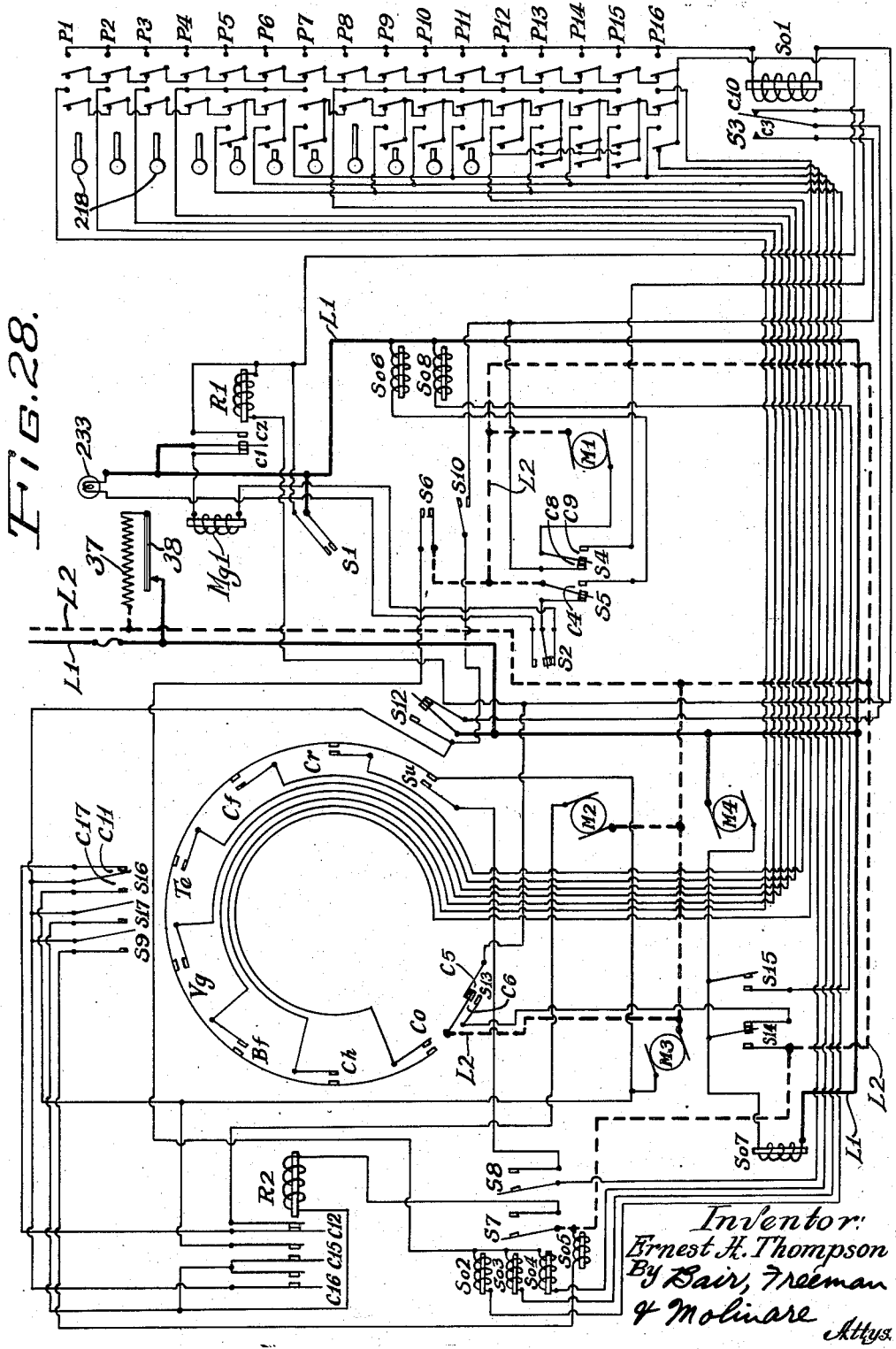

Patented Nov. 24, 1953

2,660,351

UNITED STATES PATENT OFFICE 2,660,351

PRODUCT DISPENSING MACHINE

Ernest H. Thompson, Glenview, Ill.

Application March 31, 1951, Serial No. 218,666

24 Claims. (Cl. 226—46.4)

This invention relates in general to a dispensing machine and in particular to one which dispenses a product in powdered, granular or similar form directly into a cup and thereafter discharges water into the cup for dissolving the product therein to produce a beverage.

One object of the invention is to provide a dispensing machine particularly adapted for dispensing hot drinks such as coffee, tea, cocoa or the like or powdered soups or bouillon in a convenient manner requiring a minimum of manual manipulation.

Another object is to provide a drink dispensing machine adaptable for either semi-automatic or fully automatic operation in which a plurality of different products are contained in a magazine and can be selectively dispensed therefrom and mixed with hot water, the magazines being constructed with effective sealing means against the entrance of moisture or other contamination to the products therein.

Still another object is to provide a product dispensing machine which may be made as simple or as complex as desired, such as a semi-automatic machine in which a considerable number of the operations are manually performed, a fully automatic machine in which all the operations except initiating a cycle of operation are automatically performed or various intermediate semi-automatic machines in which more or less of the operations are manually performed.

A further object is to provide a product dispensing machine including a magazine comprising a number of magazine tubes in which a plurality of different products may be stored and from which they may be selectively dispensed, the magazine tubes being indexed either manually or by automatic means to a cup-receiving position and each magazine tube including a charge forming unit operable under manual or automatic control to discharge a charge of the product from the selected magazine tube, means being provided for thereafter discharging hot water under pressure into the cup, or a mixture of hot and cold water to provide a drink of the correct temperature.

Still a further object is to provide a drink dispensing machine for hot drinks including a hot water tank in which the temperature is thermostatically controlled and from which the flow of water to the cup may be controlled by a solenoid valve admitting water to the tank, the solenoid valve being under control of a push button in the semi-automatic machine and automatically controlled by a sequence switching arrangement in the fully automatic machine.

An additional object is to provide a readily removable magazine for either the semi or fully automatic machine having a plurality of magazine tubes which may be readily refilled by a servicing attendant in a convenient manner and in a minimum of time, the magazine including individual magazine tubes therein and each having a charge forming unit of the character more specifically described and claimed in my copending application, Serial No. 150,897, filed March 21, 1950.

Another additional object is to provide in the fully automtaic dispensing machine a paper cup dispenser, a magazine indexing mechanism, an operating mechanism for whichever charge forming unit is brought to the cup receiving station (also used in the semi-automatic machine), and a water discharge valve operated by a solenoid, all of which elements are operable in the sequence just named, the sequence being initiated by the depression of a selected push button, a number of which are provided for the various products contained in the magazine and for various combinations and quantities of some of the products.

Still another additional object is to provide a switching arrangement including relays and solenoids together with motor driven cams for insuring proper sequential operation of the various mechanisms of the fully automatic dispensing machine, and to provide for interlocking the various switches in such manner that additional push buttons cannot be used to cause a misoperation of the machine while it is operating in one cycle, switch arrangements being also provided to stop the operation of the machine at the completion of the cycle and lock it in the stopped position until another coin is deposited for placing the circuits in position for the start of another dispensing operation.

A further additional object is to provide a fully automatic dispenser, that is, one in which all the operations are performed automatically after a coin is deposited and a selector button depressed, the circuit arrangement including a repeater mechanism for varying the quantity of certain products in the magazine such as sugar or the like, that is, to automatically serve a drink having one, two or three spoons of sugar therein and to provide for two or three different products dispensed from the magazine into the cup such as cream and coffee, or cream, coffee and sugar.

Still a further additional object is to provide an indexable magazine in which a cam successively closes a series of switches and the switch which has been included in the operating circuit by a selected push button will, when closed, stop the indexing operation and initiate a product dispensing operation for the magazine tube then at the cup receiving position, the completion of the operation of the charge forming unit of that magazine tube initiating further indexing of the magazine until another switch in the circuit stops the magazine, or the magazine continues to the completion of the indexing operation whereupon circuits are established for causing the discharge of water into the cup.

In an automatic dispensing machine of the kind disclosed, it is also an object to provide means for automatically dispensing paper or similar cups to a product-and-water receiving position if desired instead of each drink being dispensed into a china or plastic cup which is positioned manually as in the semi-automatic machine.

With these and other objects in view, my invention consists in the construction, arrangement and combination of the various parts of my product dispensing machine, whereby the objects contemplated are attained, as hereinafter more fully set forth, pointed out in my claims and illustrated in the accompanying drawings, wherein:

Figures 1 to 8 illustrate my semi-automatic dispensing machine and Figures 9 to 26 illustrate my fully automatic machine which includes substantially all the parts of the manual machine and adds to them automatic mechanism for accomplishing operations that are performed manually with the machine illustrated in Figures 1 to 8.

Figure 1 is a front elevation of the semi-automatic machine.

Figure 2 is an enlarged horizontal sectional view on the line 2—2 of Figure 1.

Figure 3 is an enlarged sectional view on the line 3—3 of Figure 2 to show the water discharge nozzles.

Figure 4 is an enlarged vertical sectional view on the line 4—4 of Figure 1.

Figure 5 is a plan view of the machine with the magazine removed and a portion of the supporting wall therebelow broken away to show details of construction.

Figure 6 is a vertical sectional view on the line 6—6 of Figure 5 showing particularly a motor and the means whereby it operates a charge forming unit.

Figure 7 is a horizontal sectional view on the line 7—7 of Figure 4 showing particularly the hot water tank in the base of the machine.

Figure 8 is a wiring diagram for the motor shown in Figure 6, for the heating element of the tank shown in Figure 7, and for a solenoid valve for controlling the flow of water thereto.

Figure 9 is a front elevation of the fully automatic machine, the scale being somewhat smaller than that shown in Figure 1, an enclosing housing for the mechanism being omitted.

Figure 10 is an enlarged plan view of Figure 9 with parts broken away and other parts shown in section to illustrate details of construction.

Figure 11 is an enlarged horizontal sectional view on the line 11—11 of Figure 9 showing various motors used for operating the mechanism of the fully automatic machine, a portion of the cup dispenser, and the solenoid valve arrangement for controlling the water for the drinks dispensed from the machine.

Figure 12 is an enlarged vertical sectional view on the line 12—12 of Figure 9 and shows the lower ends of two opposite magazine tubes together with the operating mechanism for the charge forming units of the machine.

Figure 13 is a plan view of a ring gear and associated switches and of a water discharge valve, the magazine above the ring gear and switches and a catch plate that normally covers the ring gear and switches being removed.

Figure 14 is an enlarged plan view of a portion of Figure 10 just below the center of rotation of the magazine with portions broken away and shows means for locking the magazine to the ring gear.

Figure 15 is an enlarged side elevation looking at the left side of Figure 9 and shows particularly a repeater mechanism for certain of the charge forming units.

Figure 16 is an enlarged front elevation showing particularly the indexing ring gear, the mechanism therebelow which is illustrated in plan view in Figure 11, and a solenoid for operating the water discharge valve.

Figure 17 is an enlarged vertical sectional view on the line 17—17 of Figure 10 illustrating details of the water discharge valve.

Figure 18 is a vertical sectional view on the line 18—18 of Figure 17 showing the connection of the indexing motor with the ring gear.

Figure 19 is a vertical sectional view on the line 19—19 of Figure 11 showing details of the cup dispenser.

Figure 20 is an enlarged vertical sectional view on the line 20—20 of Figure 10 showing an operating cam for the cup dispenser.

Figures 21 and 22 are vertical sectional views on the line 21—21 and 22—22 respectively of Figure 10 showing cam-operated switches of the cup dispenser.

Figure 23 is an elevation of a plurality of cups in the dispenser at the indicating line 23—23 of Figure 10 and showing an empty-cup-dispenser switch in the position it is caused to assume by reason of cups being present in the cup dispenser.

Figure 9:
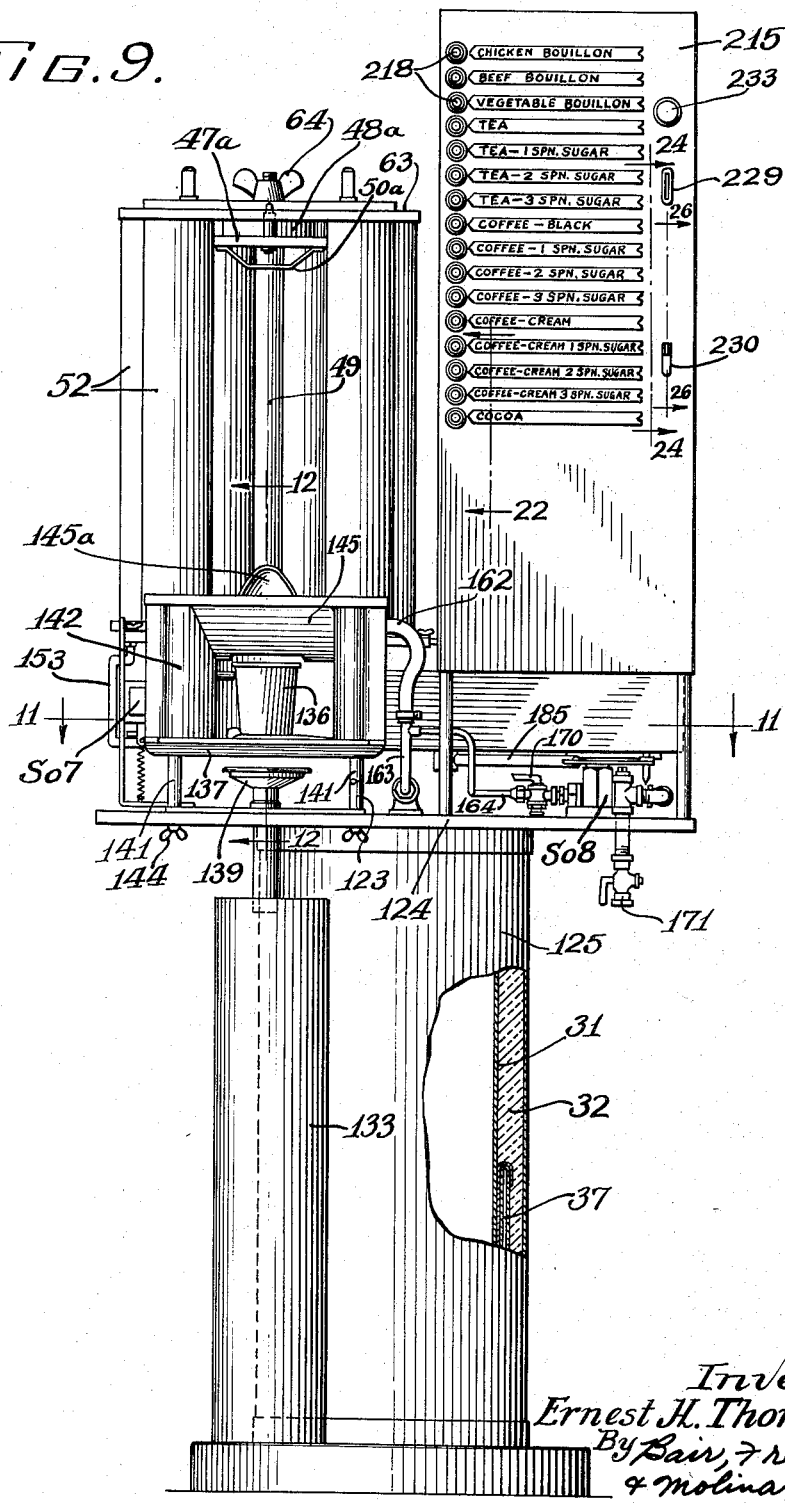

Figure 24 is an enlarged vertical sectional view on the line 24—24 of Figure 9 showing the operation of the selector push buttons.

Figure 25 is an elevation of Figure 24 looking at it from the right.

Figure 26 is an enlarged sectional view on the line 26—26 of Figure 9 showing the coin control initiating mechanism of the machine.

Figure 27 is an elevation thereof looking at Figure 26 from the left; and

Figure 28 is a wiring diagram for the fully-automatic machine.

*Description of semi-automatic dispensing machine*

Describing first the semi-automatic machine disclosed in Figures 1 to 8, a base is provided consisting of a base jacket 30 in which a water heating tank 31 is mounted. The tank 31 is imbedded in heat insulating material 32 interposed between the outer wall of the tank and a tank jacket 33. The tank jacket in turn is supported with respect to the base jacket 30 as by means of lugs 34 and 35 on the jackets 30 and 33 respectively and connected together by bolts 36 as shown in Figures 5 and 7.

Referring to Figure 4, an electric heating element 37 surrounds the lower portion of the water tank 31 for heating the water therein. The heating element is thermostatically controlled by means of a thermostat 38 shown in Figure 7, the wiring diagram therefor being shown in Figure 8. The heating element and the thermostat are in series with each other across the line indicated as L1 and L2, the usual 110 volt lighting current being suitable for the purpose.

Water is supplied to the tank 31 from a supply pipe 39 as shown in Figure 4, the pipe being connected with a water discharge valve So9 of solenoid type, the valve thereof being designated 40. A second pipe 41 is connected with the valve 40 and discharges into the bottom of the tank. A perforated baffle plate 42 is provided in the tank 31 for effecting a more even absorption of heat from the heating element 37 throughout the body of water in the tank.

Referring particularly to Figure 4, the base jacket 30 has a horizontal supporting wall 43 therein which divides the base into a shallow top compartment and a relatively deep lower compartment in which the water tank 31 is mounted. A second supporting plate 44 is mounted below the plate 43 and supported with respect thereto by screws 112 entering four bosses 113 of the wall 43 as shown in Figures 5 and 6. A central supporting pin 45 has its shouldered lower end riveted thereto. The pin extends upwardly through the supporting wall 43, a C-shaped washer 46 being provided mounted in a groove of the pin 45 for supporting the wall 43 in relation to the somewhat heavier supporting plate 44.

The supporting pin 45 is provided for the support of a removable ingredient product magazine of the kind specifically shown, described and claimed in my above mentioned copending application, Serial No. 150,897. This magazine is of the indexing type and the general details thereof will now be described.

A base plate 47 has a depressed central hub 48 perforated at its center and the lower end of a center tube 49 has its lower end secured to the hub as by welding in the perforation. A brace bar 50 serves to rigidly connect the tube 49 to the base plate 47. The hub 48 is supported on a thrust bearing 59.

The base plate 47 is provided with concave seats 51 for magazine tubes 52 which are removably associated with the base plate. One of the seats 51 can be seen in detail at the right side of Figure 2 where the adjacent magazine tube 52 has been broken away. The tubes are held in position with respect to the plate 47 by means of hooks 53 entering slots 54 of the plate.

In Figure 2 it will be noted that there are eight of the magazine tubes 52. These may contain powdered or granular products such as (reading clockwise and beginning at the lower left magazine tube) cocoa, chicken bouillon, beef bouillon, vegetable bouillon, tea, coffee, cream and sugar. Any suitable products, of course, may be dispensed from the machine and the list just given is only for the purpose of illustration and to aid in describing the operation of the machine later on in the specification. For convenience in such description, the ingredients have been labeled on the dispensing tubes 52 in Figure 2.

The magazine tubes 52 are covered by a removable sheet metal casing 55 (omitted from Figure 4) which closely surrounds the tubes as in Figure 2 and is normally secured in position by wing screw 56, slots 57 in the lower end of the casing 55 being provided to pass down over the wing screws as the casing is inserted in position. The casing ends with flanges 58 which are spaced from each other as shown in Figure 2 and the gap is closed by a cover plate 60 held normally in position by leaf spring catches 62. This cover may have the price list of the various beverages thereon as partially illustrated in Figure 1 and is removable for the purpose of providing a vertical slot between the flanges 58 through which the servicing attendant may thrust his arm for grasping the central tube 49 for the purpose of lifting the entire magazine as a unit off the supporting pin 45 when servicing the machine.

The magazine tubes 52 are tied together at the top by means of a top plate 47a similar to the base plate 47 but inverted relative thereto as more fully disclosed in my copending application. This plate for the semi-automatic machine is not shown but it does appear in Figure 9 directed to the fully-automatic machine. The plate 47a is provided with slots similar to those shown at 54 in Figure 2 and the magazine tubes have fingers 53 adjacent their upper ends also to enter such slots whereby the tubes are supported in the seats 51 of both the base plate 47 and the top plate 47a by the fingers. A cover 63 is provided and consists of a flanged disc with a suitable gasket therein to contact the open upper ends of all the magazine tubes 52, the contact being assured by means of a removable wing nut 64 all as fully described in said copending application. In this way, the wing nut can be removed for opening all the magazine tubes for refilling the purposes. A false cover 62 provided for appearance may also be retained by the wing nut 64.

The magazine tubes 52 being removable due to their fingers 53 entering the slots 54 of the base and top plates 47 and 47a are renewable when required as when a charge forming unit removably positioned in the lower end of a magazine tube is not operating properly. These charge forming units are described by reference numerals 65 to 87 in which 65 is the bottom of a channel-shaped support (see Figure 4). The support 65 includes a substantially rectangular discharge spout 66 having a top element 67 engaged against the lower end of the outer edge of the tube 52.

The charge forming units are removably secured in the lower ends of the magazine tubes 52 as disclosed in my copending application and the charge forming unit includes a sleeve 68 forming a shoulder in the magazine tube, which shoulder may be somewhat enlarged by means of a wire ring 69 soldered to the inside of the sleeve.

Each charge forming unit includes a charge forming slide which is channel-shaped, its web being shown at 70. A D-shaped flanged opening 71 is provided in the charge forming slide 70, the flange extending upwardly as illustrated.

The web 70 (Figure 4 and also Figure 12 showing the parts enlarged) extends inwardly toward the center of the magazine and has a slide plate 72 secured to its bottom surface by a stud 73 and a roller stud 74. A roller 75 is journalled on the stud 74 and both studs are retained in assembled position on the web 70 and the slide plate 72 by suitable nuts as illustrated.

The studs 73 and 74 have shouldered portions slidable in a slot 76 of the channel-shaped support 65. With such arrangement, the slide plates 72 can be moved from the normal position in Figure 4 and at the right side of Figure 12 to the discharging position shown at the left side of Figure 12 by dot-and-dash lines.

The lower end of the flexible discharge spout 77 surrounds the flange of the opening 71 and is provided at its upper end with a bead 78 to rest on the upper end of the sleeve 68 and the wire ring 69. The bead 78 is slightly larger than the internal diameter of the magazine tube 52 to provide a seal between the spout and the tube.

The discharge spout 77 is made of thin rubber, neoprene, or similar material, and its lower end is held in sealed relationship with the flanged opening 71 by a clamp band 79, the clamp bolt therefor being shown at 80. Within the flanged opening 71, a charge sizing element 81 is located and this may also be made of rubber, neoprene or the like, the sizing element being thus readily removable from the flanged opening so that one of a different size or wall thickness can be inserted for dispensing a larger or smaller charge of product in an obvious manner.

A flap valve 82 is provided for the lower end of the flanged opening 71 and it is faced with a combination gasket and hinge element 83, the radially inner margin of which is secured to the bottom of the slide plate 72 as by cement. The radially inner end of the flap valve 82 terminates in a depending actuating flange 84 adapted to travel in a slot 85 shown at the left side of Figure 12, this slot being in the web of the channel shaped support 65. This arrangement provides for causing a relatively quick and automatic opening of the flap valve 82 as will hereinafter appear.

An abutment roller 86 is mounted across the charge forming unit to seal it off from the magazine tube 52 at the time the product is discharged from the charge forming unit. The supporting wall 43 serves as a catch plate for any of the product that might leak from the charge forming units and is readily accessible to the servicing attendant whenever the magazine unit is removed from the supporting pin 45 for cleaning out such product.

The wall is interrupted adjacent the front of the machine which is the right side in Figure 4 by a semi-circular depression 87 (see also Figure 7) adapted to receive a beverage cup 88. A rod 89 bent C-shape serves as a stop for the cup in proper position to receive charges of product from the various magazine tubes. This rod is supported on a cup supporting plate 90 which forms the top of a removable container 92 fitted in the depression 87, the cup supporting plate being perforated so that any spillage may pass through the perforations into the container 92 which may be periodically emptied.

The cup 88 when in position is also adapted to receive water from water discharge nozzles 93 of a water delivery pipe 94. This pipe as shown in Figure 4 leads out of the top of the water tank 31 and the exposed portion thereof may be covered as with neoprene or the like 95.

Figure 1:
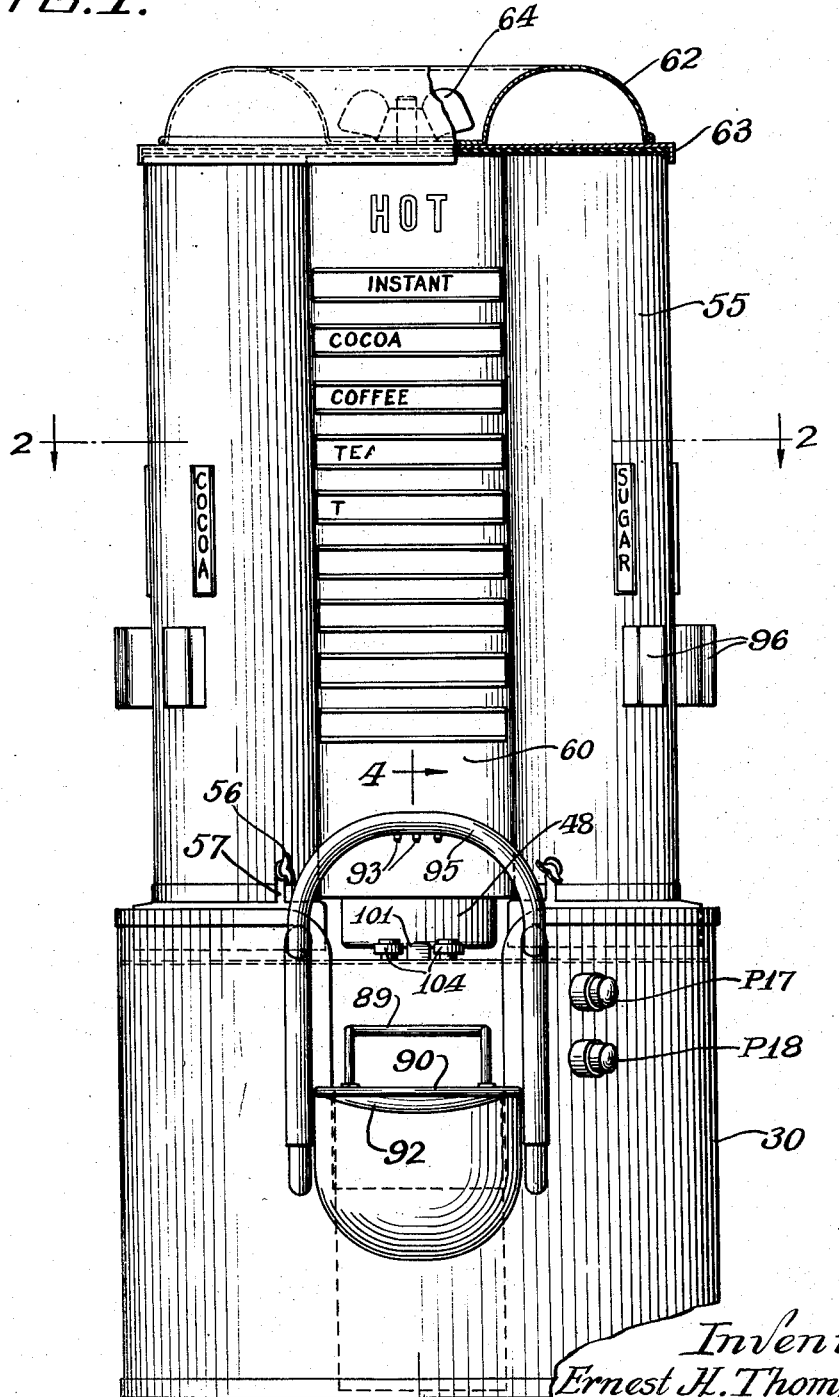

The magazine unit is adapted to be manually rotated and for this purpose handles 96 are provided thereon. Adjacent each handle the product corresponding thereto may be indicated as shown in Figure 1. Each magazine tube from which a product is desired is rotated to the cup receiving position with its charge forming unit aligned with the cup 88 and thereafter the cover plate 60 is centered relative thereto as in Figure 2 after the various powders have been dispensed into the cup and the cup is ready to receive the water from the nozzles 93.

The charge forming units of the magazine tubes are adapted to be operated by mechanism which will now be described; a slide 97 (see Figures 4 and 5) has a pair of slots 98 and 99 therein. The slot 98 surrounds the center pin 45 and the slide 97 is retained against the supporting plate 44 by a C-shaped washer 91 in a groove of the pin. An actuating shaft 100 passes through the slot 99. The slide 97 has an actuating flange 101 located in such position as shown in the right half of Figure 4, that the magazine unit when indexed will bring a stud 73 immediately back of it and a roller 75 immediately in front of it.

It will then be obvious that when the slide 97 is propelled toward the right in Figure 4, it will move the slide plate 72 also toward the right, the flange 101 traveling in a slot 102 of the supporting wall 42 (see also Figure 5) until it engages a bumper 103 of rubber or the like. During this motion, the roller 75 passes between a pair of guide rollers 104 which properly line up the magazine unit in the event it is slightly out of line. If it is too much out of line, the flange 101 will either miss the roller 75 or engage it so far off-center that it will swing it out of the way after which the magazine can be properly aligned manually and the desired charge of product dispensed by another operation of the slide 97 and the slide plate 72.

For actuating the slide 97, the shaft 100 is provided with a cam 105 cooperable with rollers 106 and 107 on the slide, and a spring 108 has one end attached to the supporting plate 44 as shown in Figure 5 and its other end attached to a perforated ear 109 on the slide. This tends to move the slide toward the right in Figure 4 (downwardly in Figure 5). The cam 105 is so shaped that upon slight rotation clockwise from its position shown in Figure 5, the roller 106 will engage a sudden drop of the cam so that the slide 97 is propelled forwardly rather rapidly by the spring 108 and is stopped in its forward motion by the bumper 103. Soon after the slide strikes the bumper, it is retracted by the rise on the cam 105 as the shaft 100 continues to rotate in a clockwise direction and finally stops again at the position shown in Figure 5 at the end of a cycle of dispensing operation.

Referring to Figure 6, the shaft 100 is driven by bevel gears 109 and 110, the bevel gear 110 in turn being driven from a product dispensing motor M3. The rotation of the motor is transmitted through suitable step-down gearing in a gear casing 111 in a well known manner.

Referring to the circuit diagram in Figure 8, the motor M3 is energized from the line wires L1 and L2 by a product dispensing push button P17. A dispensing slide switch S16 of the "full stroke" type shunts the push button P17 and is normally open which position is illustrated in Figure 5. It is held in this open position by a pin 114 on the slide 97 so that when the push button P17 is depressed momentarily, it will start the motor M3 so that the cam 105 will rotate sufficiently for the spring 108 to propel the slide 97 downwardly in Figure 5 and as soon as it starts this movement the switch S16 closes to keep the motor M3 energized until the pin 114 returns to the position illustrated even though the operator removes his finger from the push button P17. This insures a full stroke or cycle of operation of the slide 97 to complete a dispensing operation for a charge of product from the magazine tube selected.

A water dispensing push button P18 is provided for the coil of the water discharge solenoid valve So7. The coil is normally de-energized and may be energized from the line wires L1 and L2 by depressing the push button P18.

*Practical operation of the semi-automatic machine shown in Figures 1 to 8*

This machine is particularly adapted for soda fountains and the like to be operated by the clerk or to dispense free drinks to employees and the like. Regular china or plastic cups may be used, or if desired paper cups may be used. The cup 88 is first positioned on the cup supporting plate 90 as shown in Figure 4 against the C- shaped rod 89 and the magazine unit may then be indexed as desired. Probably the most complicated combination would be a beverage consisting of coffee and cream with three spoons of sugar. The sugar, coffee or cream magazine tube may first be positioned over the cup by grasping, for instance, the sugar knob 96 and rotating the magazine unit clockwise until this particular magazine is over the cup. The push button product dispensing button P17 may then be depressed and held depressed until two charges of sugar have been dispensed into the cup and the slide 97 starts to dispense the third charge. The push button may then be released and after the third charge of sugar has been dispensed, the slide will stop in the normal position of Figure 5.

The coffee knob 96 may then be brought to position over the cup and the button P17 depressed for a single coffee dispensing operation. Likewise the cream may be dispensed, either a single charge or two charges if desired by holding the push button P17 depressed long enough for the second cycle to start.

The magazine may then be rotated to the normal position shown in Figure 2 so that the magazine tubes and their charge forming units are away from the cup 88 to minimize vapor rising from the cup and acting upon the product in any charge forming unit that may otherwise be left in position over the cup 88.

The water dispensing button P18 may then be depressed and will open the solenoid valve So9—40 to admit water to the bottom of the tank 31, which displaces hot water from the top thereof and discharges it from the water discharge nozzles 93. When the cup is nearly as full as desired, the push button P18 may be released for de-energizing the solenoid So9 which causes the valve 40 to reclose and the pressure in the pipes 41 and 94 and in the tank 31 will reduce to atmospheric. This arrangement permits compensation for contraction and expansion in the tank and piping with any excess expansion merely discharging a few drops of water from the nozzles 93 which pass through the perforations of the cup-supporting plate 90 and are deposited in the container 92.

*Description of fully-automatic dispensing machine*

The automatic machine shown in Figures 9 to 28 uses the same magazine unit that is described in connection with the semi-automatic machine. The casing 55 and the cover 60 of Figure 1 are not used and in Figure 9, I illustrate the fully-automatic machine without a suitable cover that would be preferably provided for the magazine. Since the magazine unit is the same as described particularly in connection with Figures 2 and 4 and as disclosed in my copending applications, I will make no further reference to its details of construction except wherein an additional element is provided in the form of a connecting means between the magazine and a ring gear 117.

This connecting means consists of a connecting hook 115 adapted to engage a pin 116 projecting upwardly from the ring gear 117 (see Figures 10, 13, 14 and 16). The hook is carried by a rock shaft 118 which is normally rocked counter-clockwise in Figures 10 and 14 by a spring 119. A lever rod 120 is provided to unlock the hook from the pin when desired. The rock shaft is relatively short and journalled in the magazine base plate 47.

In the fully-automatic machine in place of the central supporting pin 45 for the magazine, a similar supporting pin 121 is provided (see Figure 12) which is riveted in a supporting plate 122. The plate 122 is supported by posts 123 extending upwardly from a platform 124. The platform in turn is supported on a post-like base 125 which houses a suitable water tank provided with an electric heater which is thermostatically controlled and which tank is also numbered 31 in Figure 11. The shape of the tank is somewhat modified when compared with the one shown in Figures 4 and 7 but operates essentially in the same manner and accordingly will not be described in detail, its circuit being the same as disclosed in Figure 8 and including a similar thermostat. The thermostat for both the semi- and fully-automatic machines may be adjustable for supplying water of a predetermined temperature and the circuit for the fully-automatic machine is shown diagrammatically in Figure 28.

Returning to Figure 12, thrust bearing 59 takes the weight of the magazine unit. The slide 97 of Figure 5 has also been somewhat modified for the fully-automatic machine and a comparable slide 126 is shown perhaps best in Figure 12. It has a slot 127 guided on a roller 128 and an extension 129 guided in a slot of an angle bracket 130 secured to the supporting plate 122. The actuating flange for the roller 75 and the stud 73 comparable to the flange 101 in Figure 4 is shown at 131 in Figure 12 and the plate 122 is slotted at 132 for the slide 126. The actuating spring 108 is provided in the fully-automatic machine the same as in the semi-automatic machine.

Also the motor M3 is shown in Figure 12 for driving the cam 105 which coacts with the rollers 106 and 107 on the slide 126. The driving mechanism including the shaft 100 and the bevel gears 109 and 110 is a slightly different arrangement than disclosed in Figure 5, but operates in substantially the same manner.

In the fully-automatic machine, instead of the container 92, I provide a somewhat larger container 133 to receive drippings from the machine and to also receive paper cups after they are used. The cup support in the fully-automatic machine is shown as a cup supporting plate 134 and is preferably provided with upstanding flanges 135 to support and position a paper cup 136. Below the supporting plate 134 a deflector plate 137 is provided and it has a flanged opening 138 over a funnel 139 which has a spout 140 extending through the platform 144 and entering the top of the container 133.

The cup supporting plate 134 has depending therefrom a pair of posts 141 which are removably secured to the platform 124 by wing screws 144 so that the entire assembly of the cup supporting plate 134 (which is removable from the deflector plate 137), side cup guards 142 and a top cup guard 145 are removable as a unitary assembly. The guard 145 is provided with an opening 146 through which the selected product from the magazine unit is discharged, the discharge spout 66 being located directly over this opening in the indexed position of the magazine unit.

In the fully-automatic machine, the water is also adapted to be discharged through this opening from nozzles 147 (see Figure 17) of a water discharge valve body 148. This valve body is supported by clamp brackets 149 on a channel-shaped support 150 mounted behind the cup guard 145. A valve stem 157 passes through a packing 158 and into the valve body 148 and terminates in a valve plug 159 normally seated against a valve seat 160 by a spring 161.

The valve plug 159 is actuated by a water discharge control solenoid So7 shown in Figure 16 and the details of connection are as follows: the solenoid is provided with a movable core 151 normally in the lowered position by gravity and by the action of a spring 152. The core is connected to a slide 153, the upper end of which is provided with a cam surface 154 to coact with a roller 155 carried by a slidable valve stem extension 156. This extension is connected to the valve stem 157.

The right hand end of the valve body 148 as shown in Figures 16 and 17 is connected by a water delivery tube 162 which as shown in Figures 9 and 11 is connected with both a hot water pipe 163 and a cold water pipe 164. The hot water pipe 163 comes from the tank 31 to which water is supplied through pipe 165 from a hot water control valve So6 of the solenoid type and has a relief valve 163a (see Fig. 11) discharging through a pipe 163b to the waste container 133. This takes care of expansion of the water when heated by the heating element 37 from a cold start.

The water supply for the fully-automatic machine is indicated at 166. It is connected to the solenoid valve So6 through a shut-off cock 167 and a pressure regulator valve 168. The cold water is supplied directly from the supply pipe 166 through the valve 168 to the cold water pipe 164 after passing through a cold water control valve So8 of solenoid type. Shut-off cocks 169 and 170 are provided for the pipes 165 and 164 respectively and a drain cock 171 (see Figure 9) is provided for use when installing, removing or repairing the machine.

Back of the cup guard 145 is a spray guard 145a (see Figures 9 and 10) to prevent any stray spray from the nozzles 147 impinging the two adjacent magazine tubes 52.

For automatically indexing the magazine, the ring gear 117 already referred to is used. This ring gear is supported for rotation by means of a plurality of flanged rollers 172 as shown in Figures 13 and 16 and a pinion 173 meshes with the ring gear for rotating it. The pinion is mounted on a vertical shaft 174 driven as shown in Figure 18 by bevel gears 175 and 176 through step-down gearing within a casing 177 from a magazine indexing motor M2.

The fully-automatic machine in addition to providing for the automatic indexing of the magazine and the automatic discharge of water from the nozzles 147 which operations are performed manually in the semi-automatic machine includes a cup dispenser for automatically dispensing one of the cups 136 to the position shown in Figure 12 from a cup magazine tube 179 in which the cups are stacked and from which they are adapted to be dispensed one at a time. The cup dispensing unit in itself is not part of my present invention and accordingly will not be described in detail except as to the mechanism I have provided for moving a cup dispensed from the tube 179 to position for receiving the charges of product and water for dispensing a cup of selected beverage.

A cup 136 is adapted to drop from the cup magazine tube 179 into a cup guide tube 180 of rectangular cross section (see Figures 10, 11 and 19). I provide a cup pusher 181 slidable in the tube and having a concave forward surface to engage the cup. The pusher 181 has a pin 182 depending therefrom through a slot 183 in the bottom of the cup guide tube 180 and a link 184 connects this pin to an arm 185.

The arm 185 extends from a hub 186 mounted on a vertical rock shaft 187 which rock shaft also has an arm 188 extending therefrom. The arm 188 is constrained to swing clockwise in Figure 10 by means of a spring 189 and carries a pin 190.

The pin 190 extends through a slot 191 in a flange 192 of a slide plate 193a which plate has a second plate 193a secured thereto to provide a bifurcated arrangement to slide at its left end in Figure 20 on the rock shaft 187. The slide plate 193a is slotted at 192 adjacent its right hand end to slide on a shaft 193. The shaft 193 has a cam 194 thereon coacting with a roller 195 of the slide plate 193a and the spring 189 normally retains the roller in engagement with the cam. The cam rotates clockwise in Figure 20 for operating the cup pusher 181 as will hereinafter appear.

The cup pusher is shown in its normal position in Figure 19 and when operated it will push the cup 136 shown by solid lines to the position illustrated by dot-and-dash lines, the pusher thereafter returning to the solid line position where it is ready for receiving another cup from the cup magazine tube 179.

A cup dispensing motor M1 is provided for the shaft 193 (see Figures 10 and 21). This motor is provided with step-down gearing in a gear case 196 from which a slow speed shaft 198 projects. The shaft 198 is connected by a coupling 197 to the shaft 193.

The solenoid valves So6 and So8 are adapted to be energized by a water cam switch motor M4 as shown in Figures 11 and 15. This motor through step-down gearing in a gear case 199 rotates a shaft 200 on which a pair of cams 201 and 202 are mounted. The cam 201 is adapted to actuate a switch S14 and the cam 202 to actuate a switch S15. These switches control the energization of the solenoid valves So7 and So8 respectively and together with other switches and the electric circuit disclosed in Figure 28 cause a sequential operation of the motors M1, M2, M3 and M4 such that upon the initiation of an operating cycle, the cup dispenser motor M1 first operates to position a cup in place for receiving the powdered product and water to form a beverage followed by the motor M2 indexing the machine and the motor M3 then causing the product to be dispensed, and finally the motor M4 effecting operation of the water discharge control valve So7.

During the dispensing operation the magazine unit may be indexed more than once as when cream and coffee are being dispensed and certain of the charge forming units may be operated more than once when the magazine is in a predetermined position as, for instance, when dispensing three spoons of sugar for the beverage selected. In order to cause one, two or three charge-forming unit operations for the sugar and cocoa, a repeater unit shown particularly in Figure 15 is utilized. It consists of solenoids So2, So3, So4 and So5 for operating a ratchet wheel 203 secured to a shaft 204 to impart rotation thereto. The ratchet wheel is normally rotated counter-clockwise by a spring 203a to the position shown. It is rotated against the bias of the spring 203a by a pawl 205 carried by a bell crank 206 oscillatable on the shaft 204. The bell crank is engaged different distances from the axis of oscillation by any one of three cores, 206a, 207 or 208 for rotating the ratchet wheel 203 counterclockwise either one, two or three teeth each cycle of operation and is normally biased to the position shown by a spring 211. The cores 206a, 207 and 208 normally rest by gravity on a flange 207a.

The ratchet wheel 203 is held against the bias of the spring 203a by a holding pawl 209 which together with a finger 210 form an escapement for permitting return of the ratchet wheel to the position shown in Figure 15 due to the action of a return spring 211 whenever the escapement lever 209—210 is rocked by actuation of a repeater return solenoid So5. This solenoid has a core 212 for lifting an arm 213 (which extends from the pawl 209) against the action of a return spring 214.

An electric circuit is provided for operating the various mechanisms thus far described and such circuit includes a number of switches for operating the various relays, magnets and motors. In Figure 9, a control panel 215 is shown on which are a number of push buttons P1, P2 . . . P16. In Figures 24 and 25 these push button switches are shown in detail and consist of a plurality of stacked switch units bearing reference characters P1, P2 . . . P16 which switch units are provided with actuating pins 216 which pins are normally extended as shown for P14 and P16 in Figure 24 and adapted to be depressed by means of pivoted levers 217 actuated by finger pressure against balls 218 mounted in the panel 215. The switch P15 is shown actuated in this manner.

The switch units just referred to are of the single-pole double-throw type, two of them being stacked for P1, P2, P3, P4 and P8, three of them being stacked for P5, P6, P7, P9, P10, P11, P12 and P16, and four of them being stacked for P13, P14 and P15, as shown diagrammatically in Figure 28.

A cycle starting and push button locking solenoid So1 is located below the push buttons (see Figures 24 and 25) and is provided with a core 219 normally constrained downwardly by gravity and by a spring 220. The core is adapted to be raised when the coil of the solenoid So1 is energized.

Connected with the core 219 for operation thereby is a push button locking slide plate 221 having a right angle extension 222 surrounding an eye pin 223 which serves to connect the core 219 to the spring 220. Another spring 224 surrounds the eye pin 223 and is interposed between the right angle 222 and a washer 225 carried by the pin which serves to elevate the slide plate 221 providing one of the balls 218 is properly depressed and providing none of the others is disturbed by being partially or wholly depressed. The slide plate is provided with a plurality of locking hooks 226 for engaging the levers 217 to prevent depression of buttons not selected after a selected one has been depressed.

In addition to attracting the core 219, the solenoid So1 operates a master switch S3. This switch, as shown in Figure 28, has normally open contacts C3 and normally closed contacts C10 which are reversed when the solenoid coil is energized.

Referring to Figures 26 and 27, coin chute 227 and a coin return chute 228 are disclosed. A coin slot 229 communicates with these chutes for the purpose of receiving a coin for operating the dispenser as a vending machine. A returned coin receiver 230 is provided at the lower end of the chute 228.

A coin return magnet Mg1 is provided having an armature 231 to be attracted thereby when the magnet is energized. The armature has a coin obstructing pin 232 mounted thereon which is normally in the coin chute 227 to cause a coin entering the chute to be deflected and return through the coin return chute 228 to the returned coin receiver 230.

The magnet Mg1 is controlled by a switch S2 (see Figures 10, 23 and 27) which is of single-pole double-throw type and is normally in the position shown in Figure 23 because of the presence of one or more cups 136 in the cup magazine tube 179. When cups are present in the dispenser, the magnet Mg1 is kept energized to permit the passage of coins for vending purposes but when there are no cups, it is de-energized to return the coins and light a pilot light 233.

Again referring to Figures 26 and 27, a coin switch S1 is disclosed which switch is normally open as shown in Figure 28 and is momentarily closed by a coin that passes through the coin chute 227 and drops into a coin receiver 234. In passing through the vertical portion of the chute 227, the coin engages a spring wire 235 pivoted at 236 and adapted to depress the actuating pin 237 of the switch S1 until the coin passes whereupon the pin 237, being of the spring return type, will lift the wire 235 again to the position shown in Figure 26.

Switches S4 and S5 are shown in Figure 10 which are operated respectively by a connecting pin 238 and a cam 239 shown in Figure 10. The cam is also shown in Figure 21. The switches S4 and S5 are also of single-pole double-throw type.

Switches S6 and S10 are also shown in Figure 10 which switches are of the single-pole single-throw type and normally open as disclosed in Figure 28. The switch S6 is adapted to be closed at the beginning of the stroke of the flange slide plate 193a and opens again soon after it is closed by reason of a pin 239 of the flange 192 engaging a bumped actuating spring 240 of the switch S6 as the slide plate 193a travels downwardly in Figure 10 or to the right in Figure 20. The switch S10 is adapted to be closed by the arm 188 at the end of its swing as indicated by an arrow 241 in Figure 10.

Switches S7 and S8 are shown adjacent the upper left corner of Figure 13 and these are normally closed switches which are open when the dispensing machine is inactive, such opening being accomplished by a cam 242 on the shaft 204 of the ratchet wheel 203 at the completion of the return movement of the ratchet wheel caused by the return spring 111 and permitted by the operation of the escapement 209—210.

Referring to the upper center portion of Figure 13 and to the right end of Figure 12, a stack of switches S9, S17 and S16 is illustrated. These are shown as single-pole single-throw switches in Figure 27 except for the switch S16 which is single-pole double-throw. The switches S9 and S17 have actuating pins 243 and 244 adapted to be engaged by an actuating finger 245 pivotally carried by the slide 129 and which is constrained to the position shown in Figure 12 by a spring 246 shown in Figure 13 and which finger engages the pins 243 and 244 at the end of the forward stroke of the slide. The actuating pin for the switch S16 extends in the opposite direction and is adapted to be engaged by a finger 246 on the return stroke of the slide 129, which position is shown in Figure 12.

A pair of switches S12 and S13 are adapted to be actuated by the ring gear 117 (see Figure 13). The ring gear has a notch 247 into which a roller of an actuating lever of the switch S12 drops when the ring gear is in the inactive position shown when the ring gear has completed a cycle of rotation. During the cycle of rotation, an internal cam lobe 248 on the ring gear engages a shoe 249 carried by pivoted levers 250 to swing an arm 251 clockwise in Figure 13 for actuating the switch S13. The lobe is so located that the switch S13 is actuated for energizing the water discharge solenoid So7 during approximately 30° of rotation of the ring gear just before the ring gear stops in the position shown in Figure 13.

Water cam switches S14 and S15 are provided which are actuated by the cam 202 and 201 respectively driven by the water cam switch motor M4. The various switches, S1, S2 ... S17 are connected in the electric circuit as disclosed in Figure 28 together with the motors M1, M2, M3 and M4, the solenoids So1, So2 ... So8 and the relays R1 and R2. This circuit also includes a number of magazine indexing switches as disclosed in the electric diagram and in Figure 13. These switches include Su (for sugar), Cf (for coffee), Cr (for cream), Te (for tea), Ch (for chicken bouillon), Bf (for beef bouillon), Vg (for vegetable bouillon), and Co (for cocoa), the various products just listed being arbitrary and used merely by way of illustration.

In Figure 28, at the far right side, the selector switches back of the control panel 215 are illustrated. The right hand vertical row (when any one of them is closed toward the right) provides a holding circuit for the solenoid So1. The second vertical row establishes a circuit for the magazine indexing switches as follows:

| Push Button | Indexing Switch |
| --- | --- |
| P1 | Ch |
| P2 | Bf |
| P3 | Vg |
| P4, P5, P6 and P7 | Te |
| P8, P9, P10, P11, P12, P13, P14 and P15 | Cf |
| P16 | Co |

The third row of switches from the right of those push buttons which have three or four switches (except for P12 and P16) establish circuits for the solenoids So2, So3, and So4 as follows:

P5, P9 and P13 _____ So2
P6, P10 and P14 _____ So3
P7, P11 and P15 _____ So4

The third from the right switch for P12 and the left-hand row of switches for P13, P14 and P15 establish circuits to the switch Cr for dispensing a "coffee, cream and sugar" selection and the left switch for the push button P16 is a transfer switch for transferring current normally coming through the sugar switch Su to the repeater solenoids So2, So3, and So4, to the cocoa switch Co and through only the solenoid So4 for dispensing three charges of cocoa as this product is less concentrated than powdered coffee or tea.

The combination of selector push buttons above outlined makes possible the dispensation from a single machine of the great variety of beverages listed on the control panel 215 in Figure 9 and of course other combinations such as including cream in the tea or additional sugar in the cocoa may be added to the control panel by the addition of the proper combinations of stacked switches operated by the push buttons 218.

The arrangement is such that the push button switches P1, P2, P3, P4 and P8 dispense only from single magazine tubes corresponding to the switches Ch, Bf, Vg, Te and Cf respectively. The push button switches P5, P6 and P7 dispense from the two magazine tubes corresponding to the switches Te and Su. The push button switches P9, P10 and 11 dispense from the two magazine tubes corresponding to the switches Cf and Su. The push button switch P12 dispenses from the two magazine tubes corresponding to the switches Cf and Cr. The push button switches P13, P14 and P15 dispense from the three magazine tubes corresponding to the switches Cf, Cr and Su and the last push button switch P16 dispenses from the single magazine tube corresponding to the switch Co.

*Practical operation of fully automatic machine of Figures 9 to 28*

The operator deposits a coin in the coin slot 229 which coin, if accepted, will momentarily close the coin switch S1. Acceptance is dependent on the presence of cups 136 in the cup dispenser 179 which, if present, close the switch S2 of Figure 23 downwardly (see center of Figure 28) for establishing the circuit from line L1 (heavy solid line) through the contacts C1 of the relay R1, the coin return magnet Mg1 and the lower contacts of the switch S2 to the left hand contacts of the switch S5 back to the line L2 (heavy dotted line). If no cups are present, the closure of the upper contacts of the switch S2 furnish current from L2 and the left contacts of switch S5 to the pilot light 233 having one terminal connected with the line L1 thus indicating visually that there are no cups in the cup dispenser. This permits a spring 252 for the armature 231 of the coin return magnet Mg1 in Figure 27 to hold the armature in the dotted position so that the coin obstructing pin 232 will cause the coin to return through the coin return chute 228 to the returned coin receiver 230.

Continuing with a normal dispensing operation, closure of the coin switch S1 also energizes the relay R1 through contacts C5 of the switch S13 which switch has its movable blade connected with the line wire L2. Energization of the coil of the relay R1 opens its contacts C1 for deenergizing the magnet Mg1 thus blocking the coin chute against the acceptance of another coin during the entire beverage dispensing cycle, from the moment the first coin is accepted until the beverage is dispensed. At the same time the contacts C2 of the relay R1 are closed to establish a holding circuit for the coil of the relay from L1 through C2 and the relay coil to the contact C5 of the switch S13 so that the relay will remain energized after the coin switch S1 opens because of the coin passing on through the coin chute to the coin receiver 234.

The switch S1 also closes a circuit from L1 to the push button switch P16 on the control panel 215, thus conditioning the push button assembly for a selection of a desired beverage by the operator. Selection is then made and by way of example we will use push button P15 for coffee with cream and three spoons of sugar. The swinging of the movable switch blade of P15 toward the right establishes a circuit through the far right hand wire in Figure 28 to energize the solenoid So1 having a return circuit through the bottom wire of this figure and also through the contact C5 of the switch S13 to the line L2. This circuit is also held closed by the contacts C2 of the relay R1.

Each of the push buttons P1, P2 . . . P16 actuates two or more switches as already disclosed for closing several predetermined circuits for proper indexing of the magazine unit and for the predetermined number of cycles of operation of the charge forming unit of a selected magazine tube. Each push button, having its right hand switch in Figure 27 arranged in series with each other and with the solenoid So1, provides a circuit which is common to all push buttons and serves to start the dispensing cycle by energizing the cycle-starting and push button-locking solenoid So1.

The cycle is started by the energization of the solenoid So1 operating the switch S3 to open its contacts C10 and close its contacts C3 and at the same time the energization of the coil of the solenoid elevates the slide plate 221 to the position illustrated in Figure 24 for locking the push buttons other than the selected one (P15) against subsequent depression until the beverage dispensing operation has been completed. It will also be noted that the locking hook 226 for the lever 217 for P15 is in position for preventing return of the switch P15 to normal position because it is interposed between the lever and the control panel 215.

The circuit of the cup dispensing motor M1 is closed by the contacts C3 of the switch S3 from the line L2 through M1 and the contacts C8 of switch S4 to the contacts C3 and then to the right hand contacts of the ring gear switch S12 which at this time are closed to supply current from the line L1. The energization of the cup dispensing motor M1 causes clockwise rotation of the cam 194 in Figure 20 until the drop thereof registers with the roller 195 which permits the spring 189 to swing the arm 188 through the slot and pin connection 190—191 in order to rotate the rock shaft 187 clockwise in Figure 10.

Referring to Figures 11 and 19, this clockwise rotation will swing the arm 185 clockwise to move the cup pusher 181 toward the left from the position shown in Figure 19 and push the cup 136 from the solid line position there shown into the dot-and-dash position properly positioned on the cup supporting plate 134, the flanges 135 thereof and against a positioning pin 253. The motor M1 will continue to be energized until its circuit is broken by opening of the contacts C8 of the cam switch S4 at the completion of one rotation of the cup dispenser motor shaft 198, the contacts C8 thereby serving as a holding switch to insure a full rotation of the motor-operated shaft 198 after the contacts C3 are closed and until they are subsequently broken at the completion of the beverage dispensing cycle. The switch contacts C8 reclose at the end of the cycle for conditioning the circuit of the motor M1 for the next cycle.

The cam switch S5, also actuated by the cup dispensing motor M1, is opened on the left side in Figure 28 and closed on the right side (contacts C4) by passage of a lobe 239a of the cam 239 past an actuator spring 239b of the switch S5 in Figure 21. The contacts C4 close a circuit from the line L2 to one side of the coil of the hot water solenoid valve So6 which solenoid on its other side is connected directly to the line L1.

The slide plate 193, when released by the drop of the cam 194, momentarily closes the switch S6 to complete the circuit to whichever one of the three repeater unit solenoids So2, So3 or So4 has been provided with a circuit from a selected push button. The repeater solenoids selectively rotate the ratchet wheel 203, one tooth if the solenoid So2 is energized by depression of either the button P5, P9 or P13, two teeth if the solenoid So3 is energized by depressing either the button P6, P10 or P14, and three teeth if the button P7, P11, P15 or P16 is depressed thereby closing the switches S7 and S8, as soon as the ratchet wheel starts to rotate away from the normal position shown in Figure 15. The ratchet wheel is then held against the counter-rotation bias of the spring 203a by the escapement pawl 209 and is permitted to return under the action of the spring one tooth at a time as the solenoid So5 is energized a number of times by repeated closings of the switch S9 by the finger 245 at the end of the forward stroke of the slide 126 and its extension 129 on which the finger is mounted (see Figure 12). This rotates the ratchet wheel 203 back to the initial position, either one, two or three teeth and operates the charge forming slide unit by reciprocations of the slide 126 either one, two or three times as required for the beverage selected. Finally when the ratchet wheel is returned to the normal position, the switches S7 and S8 are opened again by the cam 242 for conditioning the circuit for the next dispensing operation.

When the cup pusher 181 transfers the cup from the solid line position of Figure 19 to the dot-and-dash line position shown therein where it is adapted to receive the product and water for the selected beverage, the arm 188 (see Figure 10) swings as indicated by the arrow 241 to close the switch S10 thus causing the magazine indexing motor M2 to rotate the ring gear 117. As the gear rotates it closes successively the switches Su, Cr, Cf, Te, Vg, Bf, Ch and Co. After closing the switch Co, it opens the contacts C5 of the switch C13 and closes the contacts C6 thereof and then returns the switch S13 to the normal position shown in Figures 13 and 28. The circuit for the motor M2 may be traced from the line wire L2 connected with the motor through the contacts C12 of the relay R2, the contacts C11 of the switch S16, bypassing the switch S12 and then through the switch S10 and the contacts C3 of the switch S3 to the right hand contact of the switch S12, the center contact of which is connected with the line L1.

The switches Su . . . Co are each engaged by the cam lobe 248 and momentarily closed during the rotation of the ring gear but only the one or ones energized by the selected push buttons P1 . . . P16 will complete the circuit to the product dispensing motor M3 the circuit of which may be traced from the line wire L2 through the motor M3 and then through the outside circular wire surrounding the indexing switches Su . . . Co in Figure 28 to the selected circuit such as switch Cf and from it to any of the push buttons P8 to P15 inclusive. The switch S12 also actuated by the ring gear (normal position in the notch 247 when the dispenser is inactive) insures the completion of the rotation cycle of the ring gear initiated by energization of the motor M2 by the switch S10.

The delivery of the product for the selected beverage from the magazine unit into the prepositioned cup is accomplished by means of the slide 126 impelled by the spring 108 (see Figure 12) to the dotted position illustrated at the left side of the figure, this slide being normally held in the retracted position by means of the cam 105 in the position shown in Figure 11. This cam rotates clockwise and accordingly soon after it starts to rotate the sudden drop on it permits the slide 126 to be propelled rapidly toward the cup 136 carrying with it the charge forming unit including the slide plate 72 having the flanged opening 71 that receives a charge of the product. The flexible discharge spout 77 is closed off from the interior of the magazine tube by both of the spout sides contacting the roller 86 and the flap valve 82 will be suddenly opened by engagement of its actuating flange 84 with the forward end of the slot 85. This permits the charge of product to drop into the cup 136 and the speed of movement of the flap valve tends to shake substantially all of the powdered product therefrom. Also when the slide plate 72 is retracted by the reverse movement of the slide 126, the flap valve 82 will engage a depending flange 255 of the discharge spout 66 for closing the flap valve quickly and thus effectively sealing its gasket 83 against the bottom of the flanged opening 71 of the slide plate 72.

To assure proper dispensation of the product into the cup, the rotating magazine unit is momentarily stopped by the opening of the contacts C11 of the switch S16 which are normally engaged by the cam retracted spring loaded slide 126, the finger 246 (Figure 12) accomplishing this operation. The opening of the contacts C11 interrupts the rotation of the ring gear 117 and consequently the magazine unit. This interruption may be continued even after the contacts C11 of the switch S16 are closed by the return of the slide 126 to the normal position, by a secondary interruption of the circuit for the motor M2, due to opening of normally closed contacts C12 of the relay R2. This relay is energized only when the contacts of the switch S7 have been preclosed by the actuation of any one of the repeated solenoids So2, So3 or So4. The relay R2, however, is not actually energized until the contacts of the switch S17 have been closed by the actuation of the slide 126 to its forward position with the finger 245 engaging the actuating pin 244 thereof. This, of course, is at the forward end of the spring actuated stroke of the slide 126.

The relay R2 remains energized until the switch S7 of the repeater unit has been reopened by the resetting of the repeater unit to the normal position as a result of the completion of all necessary operations of the escapement or reset solenoid So5. It is energized through the momentary closing of the switch S9 at the forward end of the stroke of the slide 126.

When the relay R2 is not energized by the repeater unit as above described, the magazine indexting motor M2 circuit will be closed as soon as the contacts C11 of the switch S16 have been again closed by the return of the slide 126 to the normal position thus restarting the interrupted movement of the ring gear and the magazine unit driven thereby.

When, however, the relay R2 has been energized as just described, the product dispensing motor M3 will continue to operate and release the slide 126 the same number of times as the teeth of the ratchet wheel 203 were advanced. The contacts C17 of the switch S16 maintain the circuit of the product dispensing motor M3 until the slide 126 has been fully retracted by the cam 105 even though the cam lobe 248 on the ring gear has disengaged the selected indexing switch Su . . . Co.

It will be noted that the repeating mechanism is effective only on the first product dispensing operation for any given beverage dispensing cycle. Its switch S8 normally energizes the switch Su whenever the repeater unit mechanism is selectively caused to operate, thus causing the charge forming unit of the first product or sugar magazine tube to function. This tube is utilized to deliver a variable quantity of sugar for such beverages as coffee or tea.

The repeater unit mechanism is also employed to cause three dispensing movements of the charge forming unit controlled by the switch Co when the push button P16 is selected for dispensing cocoa or any other beverage requiring more than the capacity furnished by one operation of the charge forming unit. The actuation of the push button switch P16 causes the left hand single-pole double-throw switch of the push button to open the circuit to the switch Su and to close the circuit to the switch Co instead of the switch Su. This arrangement transposes the action of the triple operating solenoid So4 for the charge forming unit to the switch Co.

The switch S13 (Figure 13), upon being actuated by the lobe 248 on the ring gear 117 just before the cycle of rotation of the ring gear has been completed, will open at the contacts C5 to de-energize the coil of the relay R1 and the solenoid So1 as long as the lobe engages the shoe 249, during which time the water cam switch motor M4 is energized by closure of the contacts C6 of the switch S13, this circuit being established through the right hand contacts of switch S14 in the Figure 28. The cam switch S14 is then opened on the right side and closed on the left side by rotation of the motor M4 and the switch S15 is closed by such rotation. The left hand contacts of the switch S14 maintain the circuit for the motor M4 closed for the duration of the water discharging cycle.

The solenoid valve So6 delivers water from the supply line 166 to the pipe 165 leading to the hot water tank 31 and is controlled by the contacts C4 of the switch S5 actuated by the cup dispensing motor M1. Its energization is continued during the entire water discharging cycle (until the cam lobe 239a returns to the position shown in Figure 21).

The water discharge control solenoid So7 is in a shunt circuit with the motor M4 and accordingly remains open during the entire cycle of operation of M4 which is represented by one rotation of its cam shaft 200. Energization of the solenoid So7 unseats the valve plug 159 from the seat 160 in Figure 17 by raising the slide 153 so that its cam surface 154 operates against the roller 155 for effecting such unseating in opposition to the return spring 161.

During the latter part of the water discharging cycle, the cold water control valve (solenoid valve So8) is energized by closure of the switch S15 to feed cold water directly from the line 166 to the tube 162 leading to the water discharge valve, the opening of the solenoid valve So8 thereby bypassing the tank 31. With this arrangement, hot water is supplied during the entire water discharging cycle to more thoroughly dissolve the products which were previously dispensed into the cup, and the cold water is then discharged along with the hot water for reducing the beverage temperature as desired for comfortable drinking purposes. I find that the final beverage temperature can be readily controlled by the position of the cold water cock 170 (shown partially closed in Figure 11).

The action of the cup dispensing motor M1 was interrupted at the end of the cup delivery cycle by the opening of the contacts C8 of the cam switch S4 operated by the motor M1. At the end of the product dispensing cycle, the switch S13 was actuated causing a momentary break at the contact C5 to de-energize the relay R1 and the solenoid So1. When the solenoid is de-energized, the contacts C10 of its switch S3 return to the normally closed position thus completing a circuit to the cup dispensing motor M1 through the contacts C9 of the cam switch S4. The cup dispensing mechanism now completes its cycle of operation, retracting the cup pusher 118 just as the motor M4 completes the water discharging cycle, the switches S4 and S5 being returned to the position shown in Figure 28 and the switches S14 and S15 are then also in position for proper operation in the next cycle of operation of the dispensing machine.

Briefly summarizing the operation of the fully-automatic machine:

(1) A coin deposited in the machine readies it for the cycle of operation.

(2) One of the push buttons P1 . . . P16 is depressed for initiating the cycle of operation.

(3) The cup dispenser dispenses the cup to product-and-water receiving position and is stopped at that position, the hot water solenoid valve being opened and one of the repeater solenoids So2, So3 or So4 if more than one spoon of sugar is selected for tea or coffee being actuated (or the solenoid So4 being actuated if cocoa is the selected beverage) before the cup dispenser stops.

(4) The magazine is indexed in accordance with the selection made and when it reaches the position corresponding to that selection.

(5) The charge forming unit of the indexed magazine tube is operated through its complete cycle (or two or three cycles if required for the selection made).

(5a) The magazine is again indexed at the end of the product discharging operation if another product is to be discharged for the beverage selected, for instance sugar and coffee, and if cream also is to be included in the beverage selected, the magazine is indexed a third time.

(6) The magazine is rotated toward the completion of its rotation and just before such completion the water discharge valve is opened (hot water first and then cold water being supplied to it) and remains open the full cycle of the motor M4.

(7) Upon completion of the return of the magazine to the initial position, the return part of the operating cycle of the cup dispenser is completed and when completed the parts are in the position for the next dispensing operation.

The switching arrangement is such that each step of the cycle must be completed before the next step is initiated thus eliminating any possibility of misoperation of one step causing damage to parts of the machine that are operated in subsequent steps. Misoperation during any one step stops the machine and when the trouble causing stoppage is remedied, the machine will complete the cycle that was started and stop again in the initial position ready for the next dispensing operation.

On the accompanying drawings I have illustrated two forms of my invention which I have called "semi-automatic" and "fully-automatic." In the semi-automatic type, the magazine is manually indexed and the charge forming unit is operated by an electric motor under the control of a push button to be manually depressed (one or a plurality of cycles) and the water is thereafter discharged into the cup by a second push button that opens a solenoid valve as long as the push button is depressed.

In the fully-automatic machine, a single push button is depressed depending upon the beverage desired and the machine operates automatically throughout a complete cycle including the steps of dispensing a cup to a cup-receiving position, indexing the magazine to one or a plurality of different positions, operating the charge forming unit at any of such positions, either one or a plurality of cycles, discharging hot water into the cup for mixing and dissolving the product or products therein and finally discharging sufficient cold water into the cup to lower the temperature of the beverage to that which is proper for drinking purposes. The fully-automatic machine is adaptable for coin operation so that the only manual steps necessary are the insertion of the coin and the depression of a selected push button.

Intermediate the semi-automatic and the fully-automatic machines disclosed, various other combinations of semi-automatic machines may be made including more or less of the automatic mechanism found in the fully-automatic machine and not found in the semi-automatic machine. For instance, the semi-automatic machine disclosed may be made somewhat more automatic by including the indexing mechanism for the magazine combined with selector push buttons but using china or plastic cups not furnished by the machine as in the case of the fully-automatic machine which includes a paper cup dispenser. A machine of this kind may be made as a beverage vending machine if desired by including the coin-operated mechanism of the fully automatic machine.

The semi-automatic machine described in the last paragraph may have provisions for discharging water of the proper drinking temperature into the cup as in the first described semi-automatic machine or may include the arrangement of the fully automatic machine for first discharging water that is too hot for drinking purposes in order to dissolve the products in the cup and then discharging cold water for tempering the hot water.

The disclosure is thus susceptible to various degrees of complexity and changes of this character as well as others may be made without departing from the real spirit and purpose of my invention, and it is my intention to cover by my claims any modified forms of structure or use of mechanical equivalents which may be reasonably included within their scope.

I claim as my invention:

1. A product dispensing machine of the character disclosed comprising a supporting base, a cup support thereon, a thermostatically controlled hot water tank in said base, a magazine unit removably positioned on said base, supported thereby and including a plurality of magazine tubes for various powdered products to be dispensed directly into a cup when on said cup support, said magazine being rotatably indexable and each magazine tube including a charge forming unit, a valve for controlling the flow of water to said hot water tank, a water discharge nozzle on the outlet side of said tank directed toward the interior of a cup when on said cup support, means for operating any one of said charge forming units only when its respective magazine tube is indexed to the cup supporting position and means to thereafter open said valve for discharging hot water from said tank directly into the cup to mix with the powdered product therein and agitate the resulting mixture.

2. A product dispensing machine comprising a supporting base, a cup support thereon, a tank in said base, a magazine unit supported on said base and including a plurality of receptacles for products to be dispensed into a cup when on said cup support, said magazine being rotatably indexable and each receptacle thereof including a charge forming unit, electric means for operating said charge forming unit, a valve for controlling the flow of water to said tank, a water discharge nozzle receiving water from said tank and directing it toward the interior of a cup when on said cup support, means to energize said electric means for discharging a product from one of said receptacles directly into said cup, and means to thereafter open said valve for discharging water from said tank also directly into said cup to mix with and agitate the product therein.

3. In a product dispensing machine, a magazine unit including a plurality of magazine receptacles for various powdered products to be dispensed directly into a cup or the like, said magazine being rotatably indexable and each magazine receptacle including a charge forming unit, operating means for an indexed one of said charge forming units, a solenoid valve for controlling the flow of water to such cup, and a water discharge nozzle directed toward the interior of such cup and receiving water from said solenoid valve.

4. A product dispensing machine of the character disclosed comprising a supporting base, a cup support thereon, a thermostatically controlled water heater in said base, a magazine unit removably positioned on said base, supported thereby and including a plurality of magazine tubes for various products to be dispensed into a cup when on said cup support, said magazine being rotatably indexable and each magazine tube including a charge forming unit, a valve for controlling the flow of water to said hot water tank, a water discharge nozzle on the outlet side of said tank directed toward the interior of a cup when on said cup support, means for operating any one of said charge forming units when its respective magazine tube is indexed to the cup supporting position, means to thereafter open said valve, said cup support comprising a receptacle for catching drippings from a cup thereon, said cup support being perforated to permit the flow of such drippings therethrough into said receptacle, and cup-positioning means carried by said cup support.

5. In a product dispensing machine of the character disclosed, a supporting base, a water heater therein, a magazine unit supported on said base and including a plurality of magazine tubes for various products to be dispensed into a cup or the like, said magazine being rotatably indexable and each magazine tube including a charge forming unit, a water discharge nozzle directed toward the interior of such cup, a solenoid valve for controlling the flow of water from said water heater to said nozzle, motor operated means at one position on said base for operating a charge forming unit of a magazine tube indexed to a product discharging position, said motor operated means including a spring propelled slide plate and a cam for returning said slide plate against the spring bias, said cam having a drop portion to permit the spring to quickly slide said slide plate and thereby operate said charge forming unit, and means for energizing said solenoid valve after said charge forming unit has been operated.

6. In a product dispensing machine of the character disclosed, a supporting base, a water heater therein, a magazine unit supported on said base and including a plurality of magazine tubes for various products to be dispensed into a cup or the like, said magazine being rotatably indexable and each magazine tube including a charge forming unit, a water discharge nozzle directed toward such cup, a solenoid valve for controlling the flow of water from said water heater to said nozzle, motor operated means at one position on said base for operating a charge forming unit of a magazine tube indexed to a product discharging position, said motor operated means including a spring propelled slide plate and a cam for returning said slide plate against the spring bias, said cam having a drop portion to permit the spring to quickly slide said slide plate and thereby operate said charge forming unit, means for energizing said solenoid valve after said charge forming unit has been operated, and a holding circuit for said motor to insure a complete operating cycle thereof.

7. In a product dispensing machine, a supporting base, a tank therein, a magazine unit supported on said base and including a plurality of magazine receptacles for various products to be dispensed directly into a cup or the like, said magazine being rotatably indexable and each receptacle including a charge forming unit, a water discharge nozzle directed toward the interior of such cup, a solenoid valve for controlling the flow of water from said tank to said nozzle, motor operated means at one position on said base for operating a charge forming unit of a receptacle indexed to a product discharging position, a switch for energizing said motor operated means, a holding circuit for said motor to insure a complete operating cycle thereof, and means for energizing said solenoid valve after said charge forming unit has been operated.

8. A product dispensing machine comprising a supporting base, a water heater therein, a magazine unit rotatably supported on said base and including a plurality of magazine tubes for various products to be dispensed directly into a cup or the like, each of said magazine tubes including a charge forming unit, a water discharge nozzle directed toward the interior of such cup, a solenoid valve for controlling the flow of water from said water heater to said nozzle, motor operated means at one position on said base for operating a charge forming unit of a magazine tube indexed to a product discharging position, a push button for controlling the energization of said motor, a holding circuit for said motor to insure a complete operating cycle thereof, and a second push button for energizing said solenoid valve after said motor has completed its operating cycle.

9. In a product dispensing machine of the character disclosed, a supporting base, a water heater therein, a magazine unit supported on said base and including a plurality of magazine tubes for various products to be dispensed into a cup or the like, said magazine being rotatably indexable and each magazine tube including a charge forming unit, indexing means for rotatably indexing said magazine, a water discharge nozzle directed toward such cup, a valve for controlling the flow of water from said water heater to said nozzle, electrically operated means at one position on said base for operating a charge forming unit of a magazine tube indexed by said indexing means to a product discharging position, said last means including a spring propelled slide plate and a cam for returning said slide plate against the spring bias, said cam having a drop portion to permit the spring to quickly slide said slide plate and thereby operate said charge forming unit, means for opening said valve after said charge forming unit has been operated, a push button for controlling the energization of said electrically operated means, and a holding circuit therefor to insure a complete operating cycle thereof.

10. In a product dispensing machine, a magazine unit including a plurality of magazine tubes for various products to be dispensed into a cup or the like, said magazine being rotatably indexable and each magazine tube including a charge forming unit and operating mechanism therefor, a ring gear with which said magazine unit is connected for being indexed by rotation of the ring gear, an electric motor for rotating said ring gear, a circuit for said electric motor including a coin controlled switch for initiating the operation thereof, a holding switch operated by said ring gear for maintaining the circuit through said motor until one rotation of said ring gear has been completed, a plurality of indexing switches adjacent said ring gear and operated thereby for de-energizing said motor at a selected position of the magazine unit, a plurality of selector push buttons in circuit with said last switches for selecting the one which stops the operation of said ring gear motor, said charge forming unit operating mechanism being initiated in operation by a circuit through both the selected push button and the indexing switch corresponding thereto, a holding switch for maintaining said operating mechanism in operation for a complete cycle thereof, and a switch closed thereby at the end of such cycle for re-establishing the circuit of said ring gear motor.

11. In a product dispensing machine, a magazine unit including a plurality of magazine tubes for various products to be dispensed into a cup or the like, said magazine being rotatably indexable and each magazine tube including a charge forming unit and operating mechanism therefor, a ring gear for rotating said magazine, an electric motor for rotating said ring gear, a circuit for said electric motor including selector push buttons each having a switch for initiating the operation thereof, a holding switch for maintaining the circuit through said motor until one rotation of said ring gear has been completed, a plurality of switches operated sequentially by said magazine unit as it rotates for de-energizing said motor at a selected position of the magazine unit, said charge forming unit operating mechanism being initiated in operation by the circuit through the selected push button and the magazine indexing switch corresponding thereto, and the completion of its operation re-energizing said ring gear motor until said holding switch interrupts its circuit.

12. In a product dispensing machine, a magazine unit including a plurality of receptacles for various products to be dispensed into a cup or the like, said magazine being rotatably indexable and each receptacle including a charge forming unit, a motor for operating an indexed one of said charge forming units, a second motor for indexing said magazine unit, a circuit for said second motor including a switch for initiating the operation thereof, a holding switch for maintaining the circuit through said second motor until a rotation of said magazine unit has been completed, a plurality of switches adjacent said magazine unit and operated thereby for de-energizing said second motor at a selected position of the dispensing unit, a plurality of selector push buttons in circuit with said last switches for selecting the one which stops the operation of said second motor and for initiating the operation of said first motor, a holding switch for mantaining the circuit through said first motor until a charge forming unit cycle has been completed, the completion thereof re-establishing the circuit for said second motor.

13. In a product dispensing machine, a rotatable magazine unit including a plurality of receptacles for various products to be dispensed into a cup or the like, said magazine receptacles each including a charge forming unit, a motor for operating an indexed one of said charge forming units, a second motor for indexing said magazine unit, a circuit for said second motor including a switch for initiating the operation thereof, a holding switch for maintaining the circuit through said second motor until a rotation of said magazine unit has been completed, a plurality of switches adjacent said magazine unit and operated thereby for de-energizing said second motor at a selected position of said charge forming unit, a plurality of selector push buttons in circuit with said last switches for selecting the one which stops the operation of said second motor and for initiating the operation of said first motor, a holding switch for maintaining the circuit through said first motor until a charge forming unit cycle has been completed, a repeater mechanism for repeating the operation of said charge forming unit operating mechanism in accordance with a selected one of said push buttons, the completion of the operating cycle of said charge forming unit re-establishing the circuit for said second motor.

14. In a product dispensing machine, a rotatable magazine unit including a plurality of receptacles for various products to be dispensed, a cup dispenser for dispensing a cup to a charge receiving position, a first motor for operating said cup dispenser, said magazine receptacles each including a charge forming unit, a second motor for operating an indexed one of said charge forming units, a third motor for indexing said magazine unit, a circuit for said third motor, a holding switch for maintaining the circuit through said third motor until a rotation of said magazine unit has been completed, a plurality of switches adjacent said magazine unit and operated thereby for de-energizing said third motor at a selected position of said charge forming unit, a plurality of selector push buttons in circuit with said last switches for selecting the one which stops the operation of said third motor and for initiating the operation of said second motor, said first motor being initiated in operation by the closure of a selected one of said push buttons and initiating the operation of said second motor, a holding switch for maintaining the circuit through said second motor until a charge forming unit cycle has been completed, the completion of the operating cycle of said charge forming unit re-establishing the circuit for said third motor.

15. In a product dispensing machine, a magazine unit including a plurality of magazine tubes for various products to be dispensed into a cup or the like, said magazine being rotatably indexable and each magazine tube including a charge forming unit and operating mechanism therefor, an electric motor for rotating said magazine unit, a circuit for said electric motor including selector push buttons each having a switch for initiating the operation thereof, a holding switch for maintaining the circuit through said motor until a selected position of said magazine unit has been completed, a plurality of switches operated sequentially by said magazine unit as it rotates for de-energizing said motor at a selected position of the magazine unit, said charge forming unit operating mechanism being initiated in operation by the circuit through the selected push button and the magazine indexing switch corresponding thereto, and the completion of its operation re-energizing said motor until said holding switch interrupts its circuit, means for discharging hot water directly into the cup following the reception of products therein for dissolving the products and mixing them together during the first portion of a water discharging cycle, and means for discharging cold water into the cup for tempering the hot water during the latter part of the water discharging cycle.

16. In a product dispensing machine, a hot water tank, a magazine unit including a plurality of magazine tubes for various products to be dispensed into a cup or the like, said magazine being rotatably indexable and each magazine tube including a charge forming unit, a motor for indexing said magazine unit, a solenoid valve, a water discharge nozzle valve receiving water through said solenoid valve and directed toward the interior of such cup, a second motor for operating an indexed one of said charge forming units, operating means for said discharge nozzle valve, an initiating switch for said first motor, and a holding switch to retain said first motor energized throughout a full magazine indexing cycle, a holding switch to retain said second motor energized throughout a full stroke of said charge forming unit, a magazine position and selector switch arrangement for interrupting the indexing cycle and accomplishing the charge forming unit stroke before the indexing cycle is completed, and a switch operated by said magazine unit after indexing thereof to cause operation of said operating means for said discharge nozzle valve.

17. In a beverage dispensing machine, an indexable magazine adapted to contain a plurality of products to be dispensed, said magazine including charge forming units, a cup dispenser for moving a cup to product receiving position, a water valve for discharging water into such cup, a plurality of motors for operating said cup dispenser, indexing said magazine unit, operating said charge forming unit and operating said water discharge valve, and a circuit arrangement for energizing the cup dispenser motor for causing partial operation of said cup moving means to move a cup to product receiving position and then de-energize the cup dispenser motor and energize the magazine indexing motor to initiate indexing of said magazine unit, said magazine unit upon the completion of the indexing thereof and prior to completion of a cycle of operation thereof energizing said charge forming unit motor for initiating the operation of said charge forming unit, said charge forming unit upon the completion of the operation thereof closing a circuit of the motor for said magazine unit for initiating the completion of the cycle of operation of said magazine unit and closing a circuit of said water discharge valve for initiating operation of said water discharge valve and the completion of the indexing of said magazine unit initiating the completion of the cycle of operation of said cup moving means, the completion of which reconditions the circuit for another dispensing operation.

18. In a beverage dispensing machine, an indexable magazine adapted to contain a plurality of products to be dispensed, said magazine including charge forming units, a water valve for discharging water into a cup or the like, a plurality of motors for indexing said magazine unit, operating said charge forming unit and operating said water discharge valve, and a circuit arrangement for initiating indexing of said magazine unit, said magazine unit upon the completion of the indexing thereof and prior to completion of a cycle of operation thereof energizing said charge forming unit motor for initiating the operation of said charge forming unit, said charge forming unit upon the completion of the operation thereof closing a circuit of the motor for said magazine unit for initiating the completion of the cycle of operation of said magazine unit and closing a circuit of said water discharge valve for initiating operation of said water discharge valve and the completion of the indexing of said magazine unit reconditioning the circuit for another dispensing operation.

19. A product dispensing machine of the character disclosed comprising a supporting base, a cup support thereon, a hot water tank and a thermostatically controlled water heater in said base, a magazine unit removably positioned on said base, supported thereby and including a plurality of magazine tubes for various products to be dispensed into a cup when on said cup support, said magazine being rotatably indexable and each magazine tube including a charge forming unit, a motor for indexing said magazine unit, a solenoid valve for controlling the flow of water to said hot water tank, a water discharge nozzle on the outlet side of said tank directed toward the interior of a cup when on said cup support, operating mechanism for a charge forming unit of one of said magazine tubes when in position in alignment with said cup support, a second motor for driving said operating mechanism, a push button for controlling the energization of said first motor, and switches controlled thereby for controlling the energization of said second motor and said solenoid valve to cause sequential operation thereof.

20. In a product dispensing machine, a water tank, a magazine unit including a plurality of magazine tubes for various products to be dispensed into a cup or the like, said magazine being rotatably indexable and each magazine tube including a charge forming unit, a pair of solenoid valves for hot and cold water, a water discharge valve receiving water from said solenoid valves and discharging it into such cup, a motor for indexing said magazine, a second motor for operating an indexed one of said charge forming units, and a control circuit for energizing said first motor, said second motor, said hot water solenoid valve and said cold water solenoid valve sequentially, and for opening said water discharge valve during the time said hot and cold water solenoid valves are open.

21. A product dispensing machine of the character disclosed comprising a supporting base, a cup support thereon, a water heater in said base, a magazine unit removably positioned on said base, supported thereby and including a plurality of magazine tubes for various products to be dispensed into a cup when on said cup support, said magazine being rotatably indexable and each magazine tube including a charge forming unit, a pair of solenoid valves for hot and cold water, a water discharge valve receiving water from said solenoid valves and discharging it into such cup, a motor for indexing said magazine, a second motor for operating an indexed one of said charge forming units, and a coin initiated control circuit for energizing said first motor, said second motor, said hot water solenoid valve and said cold water solenoid valve sequentially, and for opening said water discharge valve during the time said hot and cold water solenoid valves are open.

22. In a product dispenser, an indexable magazine having a plurality of receptacles for various products, each of said receptacles having a charge forming unit, a cup dispenser for dispensing a cup to a position to receive products from said charge forming units, a water discharge valve for discharging water into a cup dispensed by said cup dispenser, a plurality of motors for operating said cup dispenser, for indexing said magazine unit, for operating said charge forming unit and for controlling the flow of water to said water discharge valve, said magazine including a plurality of indexing switches sequentially operated by the magazine as it is indexed, a plurality of selector push buttons connected in circuit with said indexing switches, some of said push buttons being connected with more than one of said indexing switches, and a circuit arrangement including said indexing switches and said push buttons for energizing said cup dispenser motor, a switch operated thereby for operating said magazine indexing motor, a switch operated thereby for operating said charge forming motor and said water discharge valve in sequence for dispensing one or a plurality of products from said magazine into the cup and for thereafter dispensing water into the cup.

23. In a product dispenser, an indexable magazine having a plurality of receptacles for various products, each of said receptacles having a charge forming unit, a cup dispenser for dispensing a cup to a position to receive products from said charge forming units, a water discharge valve for discharging water into a cup dispensed by said cup dispenser, a plurality of motors for operating said cup dispenser, for indexing said magazine unit, operating said charge forming unit and controlling the flow of water to said water discharge valve, said magazine including a plurality of indexing switches sequentially operated by the magazine as it is indexed, a plurality of selector push buttons connected in circuit with said indexing switches, and a circuit arrangement including said indexing switches and said push buttons for energizing said cup dispenser motor, a switch operated thereby for operating said magazine indexing motor, a switch operated thereby for operating said charge forming motor and said water discharge valve in sequence for dispensing one or a plurality of products from said magazine directly into the cup and for thereafter dispensing first hot and then cold water directly into the cup.

24. In a product dispenser, an indexable magazine having a plurality of receptacles for various products, each of said receptacles having a charge forming unit, a support for a cup in a position to receive products from said charge forming units, a water discharge valve for discharging water into a cup dispensed by said cup dispenser, a plurality of motors for indexing said magazine unit, operating said charge forming unit and controlling the flow of water to said water discharge valve, repeater units for said charge forming unit motor, said magazine including a plurality of indexing switches sequentially operated by the magazine as it is indexed, a plurality of selector push buttons connected in circuit with said indexing switches, and a circuit arrangement including said indexing switches, said repeater units and said push buttons for operating said magazine indexing motor, a switch operated thereby for operating said charge forming motor a plurality of times as determined by said repeater units and said water discharge valve in sequence for dispensing one or a plurality of products from said magazine into the cup and for thereafter dispensing water into the cup.

ERNEST H. THOMPSON.

References Cited in the file of this patent

UNITED STATES PATENTS

| Number | Name | Date |
| --- | --- | --- |
| 1,930,540 | Saxby | Oct. 17, 1933 |
| 2,158,795 | Grubelic | May 16, 1939 |
| 2,462,019 | Bowman | Feb. 15, 1949 |
| 2,542,067 | Waite et al. | Feb. 20, 1951 |
| 2,552,856 | Knapp | May 15, 1951 |
| 2,565,084 | Parks | Aug. 21, 1951 |
| 2,569,486 | Mills | Oct. 2, 1951 |
| 2,614,738 | Mills | Oct. 21, 1952 |

FOREIGN PATENTS

| Number | Country | Date |
| --- | --- | --- |
| 450,717 | France | Jan. 12, 1913 |